US010419458B2

United States Patent
Moscovici et al.

(10) Patent No.: US 10,419,458 B2
(45) Date of Patent: Sep. 17, 2019

(54) DISTRIBUTED TECHNIQUES FOR DETECTING ATYPICAL OR MALICIOUS WIRELESS COMMUNICATIONS ACTIVITY

(71) Applicant: CYIOT LTD, Tel-Aviv (IL)

(72) Inventors: Daniel Moscovici, Netanya (IL); Natan Bandler, Tel-Aviv (IL); Assaf Schuster, Haifa (IL)

(73) Assignee: Cyiot LTD, Tel-Aviv (IL)

( * ) Notice: Subject to any disclaimer, the term of this patent is extended or adjusted under 35 U.S.C. 154(b) by 68 days.

(21) Appl. No.: 15/407,886

(22) Filed: Jan. 17, 2017

(65) Prior Publication Data

US 2017/0214702 A1 Jul. 27, 2017

Related U.S. Application Data

(60) Provisional application No. 62/428,429, filed on Nov. 30, 2016, provisional application No. 62/281,201, filed on Jan. 21, 2016.

(51) Int. Cl.
*H04L 29/06* (2006.01)
*H04W 12/10* (2009.01)
(Continued)

(52) U.S. Cl.
CPC ........ *H04L 63/1416* (2013.01); *H04L 43/028* (2013.01); *H04L 43/062* (2013.01);
(Continued)

(58) Field of Classification Search
CPC ............... H04L 63/1416; H04L 41/069; H04L 63/0263; H04L 63/1425; H04W 12/10;
(Continued)

(56) References Cited

U.S. PATENT DOCUMENTS 6,453,345 B2 9/2002 Trcka et al.
7,277,404 B2 10/2007 Tanzella et al.
(Continued)

OTHER PUBLICATIONS

Baoyuan Liu et al., "Sparse Convolutional Neural Networks," 2015, pp. 806-814, Computer Vision and Pattern Recognition (CVPR).
(Continued)

*Primary Examiner* — Mohammad A Siddiqi
(74) *Attorney, Agent, or Firm* — Nicholson De Vos Webster & Elliott, LLP

(57) ABSTRACT

Distributed techniques for detecting atypical or malicious wireless communications activity are disclosed. A server can iteratively generate sets of filters based at least in part upon observation data received from one or more Protects. The filters can be used by the Protect(s) to distinguish between sniffed wireless messages that are to be discarded and those that are to be reported to the server. The server can provide the generated sets of filters to the Protect(s) to cause the Protect(s) to process additional sniffed wireless messages utilizing the one or more sets of filters. Updated filters can cause fewer subsequent sniffed wireless messages to be reported than would have been reported by use of previous filters. Limited activity reporting by the Protect(s) enables a reduced communication load compared to full activity reporting without degrading the ability of the server to detect the atypical or malicious wireless communications activity.

28 Claims, 9 Drawing Sheets

(51) Int. Cl.
*H04L 12/24* (2006.01)
*H04W 12/12* (2009.01)
*H04L 12/26* (2006.01)
*H04W 84/04* (2009.01)
*H04W 84/12* (2009.01)
*H04W 4/80* (2018.01)

(52) U.S. Cl.
CPC ...... *H04L 63/0263* (2013.01); *H04L 63/1425* (2013.01); *H04W 12/10* (2013.01); *H04W 12/12* (2013.01); *H04W 4/80* (2018.02); *H04W 84/042* (2013.01); *H04W 84/12* (2013.01)

(58) Field of Classification Search
CPC ... H04W 12/12; H04W 84/042; H04W 84/12; H04W 4/80
See application file for complete search history.

(56) References Cited

U.S. PATENT DOCUMENTS

| | | |
|---|---|---|
| 7,979,031 B2 | 7/2011 | Tatman et al. |
| 2002/0087882 A1 | 7/2002 | Schneier et al. |
| 2002/0116635 A1* | 8/2002 | Sheymov ................ G06F 9/445 726/24 |
| 2003/0217289 A1 | 11/2003 | Ammon et al. |
| 2004/0090950 A1 | 5/2004 | Lauber et al. |
| 2004/0162995 A1 | 8/2004 | Muaddi et al. |
| 2005/0174961 A1 | 8/2005 | Hrastar |
| 2008/0109879 A1 | 5/2008 | Bhagwat et al. |
| 2014/0157405 A1* | 6/2014 | Joll ..................... H04L 63/1425 726/22 |
| 2014/0187177 A1* | 7/2014 | Sridhara ................ G06N 5/043 455/73 |
| 2014/0245374 A1* | 8/2014 | Deerman ................ H04L 63/20 726/1 |
| 2015/0161386 A1* | 6/2015 | Gupta ................. G06F 11/3612 726/23 |
| 2015/0350914 A1* | 12/2015 | Baxley ................. H04W 12/08 726/11 |

OTHER PUBLICATIONS

"Holistic Network Services Management for WLAN, Motorola Airdefense Services Platform," 2013, 4 pages, Motorola Solutions, Inc., downloaded from https://www.zebra.com/content/dam/msi-new/assets/web/Business/Products/Software%20and%20Applications/Network%20Design%20Software/AirDefense_Security_Compliance/_documents/Static_files/AirDefense_Services_Plafform_8.0_SPEC_SHEET.pdf on Sep. 20, 2016.

* cited by examiner

DISTRIBUTED TECHNIQUES FOR DETECTING ATYPICAL OR MALICIOUS WIRELESS COMMUNICATIONS ACTIVITY

CROSS-REFERENCE TO RELATED APPLICATIONS

This application claims the benefit of U.S. Provisional Application No. 62/281,201, filed Jan. 21, 2016, and U.S. Provisional Application No. 62/428,429, filed Nov. 30, 2016, which are hereby incorporated by reference.

FIELD

Embodiments of the invention generally relate to network security, and more specifically, to distributed techniques for detecting atypical or malicious wireless communications activity.

BACKGROUND

In the advent of the Internet of Things (IoT), smart systems, wearable devices, and other technological inventions, our collective future is likely to be full of wireless communicating devices. Anywhere on Earth, at any time, there will be a vast number of sensors and embedded computing processors capable of wireless communication using a variety of technologies and communication protocols such as Bluetooth, Bluetooth Low Energy (also commonly referred to as "BLE" or "Bluetooth LE"), Wi-Fi, Zigbee, Cellular, etc. Despite not being connected with interconnection wires, these devices may constantly be receiving and transmitting data over the air.

Being wirelessly connected means more flexibility in the placement of devices, and further, these devices may even be mobile. This leads the trend towards wireless systems and environments: more and more of the communication between people and between devices will utilize wireless transmissions. However, from a cyber security point of view, this also means a higher vulnerability to attacks because of two related reasons. First, it is easier for an attacker to "tap in" to wireless communications as it need not be physically wired to a common interconnect, but instead merely needs to listen/talk using a common communication protocol and channels/frequencies. Second, just like the intended recipient, an attacker may also listen to wireless communication from a distance. In a sense, the flexibility and ease of communication in wireless systems is also making it easier for prospective attackers to attack.

In any environment, some devices may be (or may become) hostile and even malicious, e.g., they may be configured and/or programmed to collect information about individuals, to intercept private communications, to intervene in transmissions, to serve as bridges for attacks targeting other devices, to create noise, to flood services with queries in order to prevent them from serving other legitimate queries, to disrupt benign communication, to redirect benign transmissions so that the attacking device becomes a mediator between communicating targets (e.g., man-in-the-middle (MITM) attacks), to inject packets into benign sessions to exploit protocol weaknesses, etc. In fact, the number of wireless attacks appears to be enormous, continues to grow, and their sophistication only increases over time.

Accordingly, techniques for protecting devices (and locations/environments) utilizing wireless communications from potentially malicious actors are strongly desired.

SUMMARY

The present disclosure relates generally to network security, and more specifically, to distributed techniques for detecting atypical or malicious wireless communications activity. Techniques are disclosed herein that can enable multiple Protects (e.g., electronic devices having sensors that can observe or "sniff" wireless communications activity) to detect atypical and/or malicious wireless network activity and devices. In some embodiments, a central control server (referred to herein as "C3") can provide filters to the Protects to enable the Protects to determine what wireless communications activity is normal (or benign) and/or what wireless communications activity is not normal (or malicious). The filters can include rule-based filters that detect signatures of known malicious behavior. The filters can include anomaly-detection filters that enable a Protect to determine how abnormal received wireless communications activity is. The filters can be specific to a particular Protect, and can be generated based upon previous activity observed by a particular Protect.

In some embodiments, the C3 can generate and/or provide device profiles to the Protects that allow the Protects to detect what wireless communication activity of the corresponding device is atypical based upon previous activity of that corresponding device, which may have been observed by that Protect and/or other Protects.

In some embodiments, the filters and/or profiles allow the Protects to quickly and efficiently distinguish between sniffed wireless communications activity that is typical or benign and sniffed wireless communications activity that is not typical or benign.

Accordingly, embodiments utilizing the filters and/or profiles can utilize Protects that are mobile devices, and which may operate efficiently (by ignoring typical/benign traffic) despite having comparatively limited processing ability, storage availability, network connectivity and/or bandwidth availability, etc. Thus, in some embodiments where at least some of the Protects are mobile devices, a user (and his/her potentially multiple devices) can be continually protected despite changing location throughout the day by utilizing a mobile Protect, which cannot be done using traditional "wired" equipment.

In some embodiments, the use of filters and/or profiles with Protects can enable these Protects to report back detected instances of atypical or malicious wireless communications activity. Some or all of the Protects can be specifically configured based upon the technical features of the particular Protects to affect the reporting of such atypical or malicious wireless communications activity. In some embodiments, a Protect that is a mobile device having limited power availability and/or limited network connectivity and/or limited storage ability can utilize the filters and/or profiles to determine how urgently certain types of wireless communications activity needs to be reported, and report back this activity at a time (e.g., immediately, with some delay, with substantial delay) determined based upon this urgency, store (or not store) copies of the wireless communications activity, etc. A non-mobile (or "wired") Protect not having power availability issues (and/or not having network connectivity/bandwidth issues, and/or not having storage issues) may instead be configured to report back (and/or store) comparatively more wireless communications activity. Thus, Protects having different resources can be enabled to continue to operate regardless of these differences.

In some embodiments, the filters and/or profiles can be refined over time by the C3 based upon observed wireless communications activity, and these refined/updated filters and/or profiles can be provided back to the Protect(s). Such refinements can further enable the Protects to reduce an amount of processing and/or storage and/or reporting by becoming more accurate over time to thus identify more and more wireless communications activity as typical/benign.

In some embodiments, the C3 can utilize reported data from multiple Protects to enrich the protection capabilities of each of the Protects. In some embodiments, a malicious signature of activity and/or a malicious device can be detected via the sniffing of one or more Protects, and the central control server can, in response, update filters and/or profiles of other Protects to protect them from malicious activity/devices that they have not previously encountered.

In some embodiments, the C3 can reduce the occurrence of false positives being identified by corroborating reported data from a first set of one or more Protects with observation data from a second set of one or more Protects, which can involve obtaining data from more and/or different wireless communications activity observed by the second set of Protects from the same time the first set of Protects observed atypical or possibly malicious activity.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

The following description describes methods, apparatuses, and systems for the distributed detection of atypical and/or malicious wireless communications activity. In the following description, numerous specific details such as logic implementations, resource partitioning/sharing/duplication implementations, types and interrelationships of system components, and logic partitioning/integration choices are set forth in order to provide a more thorough understanding of embodiments of the present invention. It will be appreciated, however, by one skilled in the art that the invention may be practiced without such specific details. In other instances, control structures, gate level circuits, and full software instruction sequences have not been shown in detail in order not to obscure aspects of the invention. Those of ordinary skill in the art, with the included descriptions, can implement appropriate functionality without undue experimentation. Accordingly, the figures and description provided herein are not intended to be restrictive.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Figure 1:
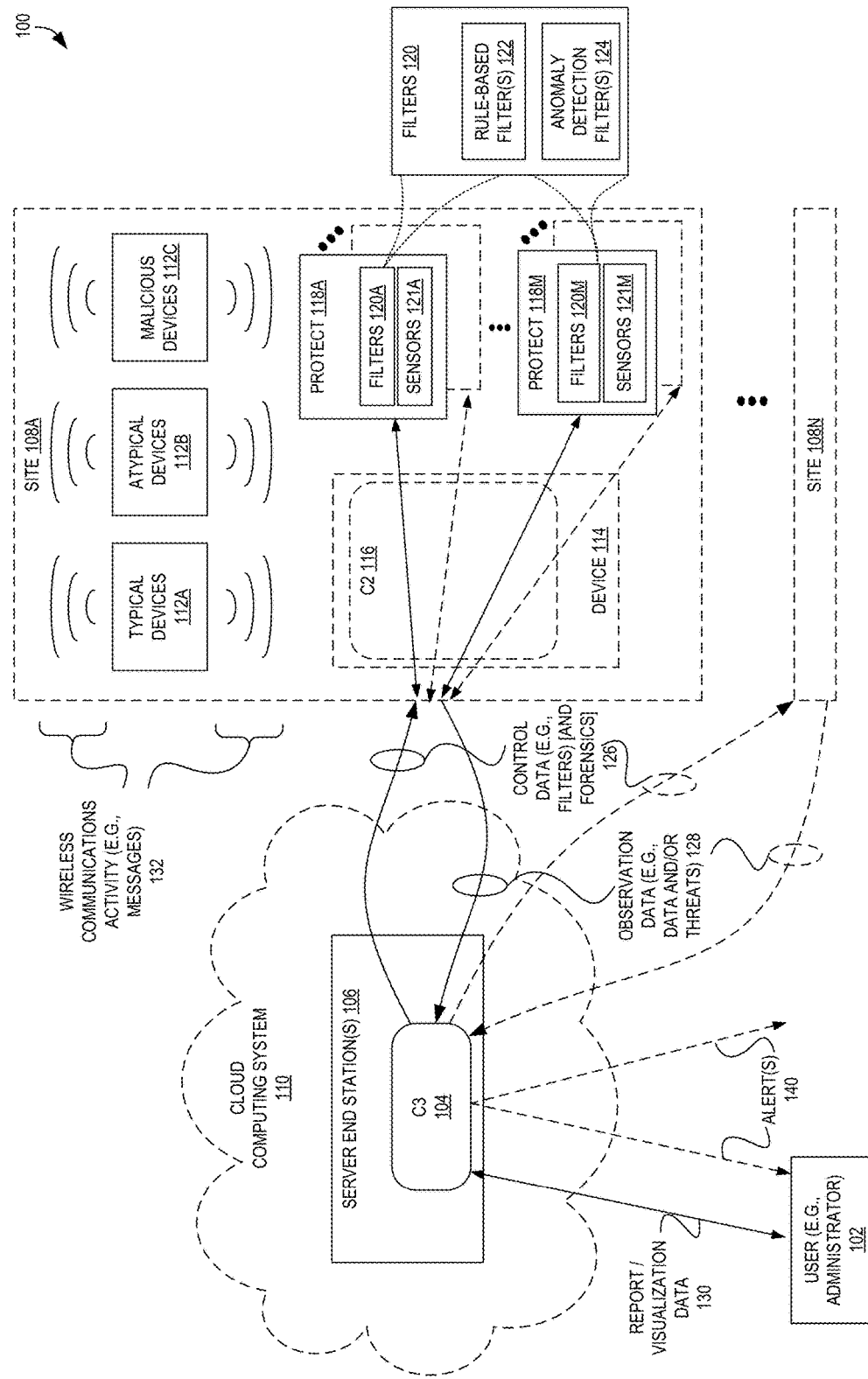
FIG. 1 is a block diagram illustrating an exemplary system including a C3 and a plurality of Protects that involves distributed techniques for detecting atypical or malicious wireless communications activity according to some embodiments.

FIG. 1 is a block diagram illustrating an exemplary system 100 including a C3 104 and a plurality of Protects 118A-118M that involves distributed techniques for detecting atypical or malicious wireless communications activity according to some embodiments.

Throughout this description, the use of a letter character at the end of a reference numeral (corresponding to an illustrated entity) is not meant to indicate that any particular number of that entity must necessarily exist, but merely that the entity is one of potentially many similar entities. For example, Protect(s) 118A-118M include both "A" and "M" letter suffixes, which means that there could be two such devices, three, four, one hundred, one thousand, etc. (Moreover, the use of dashed lines for some of the Protect(s) 118A-118M, as described above, indicates that those could be optional.) Additionally, the use of different letter characters as reference suffixes for different entities is not meant to indicate that there can be different numbers of these entities. For example, although the site(s) 108A-108N and the Protect(s) 118A-118M include different letter suffixes—i.e., "N" and "M"—there could be the same number (or different numbers) of sites and Protects in various embodiments.

Embodiments described herein provide systems that can discover and alert to the presence of such hostile (or "malicious") devices as described above, allowing for other systems and/or actors to attempt to mitigate a detected attack, etc.

Embodiments use a hierarchical architecture including several types of actors. One type of these actors include a family of Protects 118A-118M, whose goal is to expose hostile devices (e.g., new or atypical devices 112B that may or may not be malicious, malicious devices 112C, etc.) and hostile activity (part of wireless communications activity 132) in their "neighborhood" (e.g., is within a communicative range of them), where this neighborhood can be static (e.g., a non-moving Protect) or dynamic (e.g., a mobile device Protect). To perform these tasks, the Protects 118A-118M utilize one or more sensors 121A-121M (e.g., physical communication interfaces such as radios, Ethernet network interfaces, etc.) to observe communications, and then "filter" these communications according to filters 120A-120M provided to the Protects (e.g., as part of control data 126), which enable the Protects to determine how to process the communication activity that they observe.

Embodiments use a trusted center of operations command and control comprising a C3 104 as well as an optional group of local collection centers (i.e., aggregation module 116 implemented by one or more devices 114, which is hereafter referred to as "C2"), which are located at one or more sites 108A-108N (e.g., a home, business, building, room, etc.). As introduced above, C3 can be a central control server (e.g., a software module) executed by one or more electronic devices such as one or more server end stations 106.

Protects can be said to be "symmetric" with hostile devices in the following sense: they intercept, listen to, and store transmissions (i.e., wireless communications activity 132), communication meta-data, and even content sent by other devices (e.g., known or typical devices 112A, unknown or atypical devices 112B, and/or malicious devices 112C). In other words, the Protects can eavesdrop on (or "sniff") and identify hostile devices, in much the same way that hostile devices may eavesdrop on benign devices. Protects can propagate some of the data (based upon applying filters 120A-120M) they collect to C3 as observation data 128, where investigation and advanced analytics can be performed in order to discover malicious patterns and/or hostile activity, and in order to discard "false positive" alarms, namely, suspicious activity which other Protects can testify to be benign. User privacy can be maintained through smart filtering of the data that is sent to C3 and/or by keeping payload inspection to a minimum. C3 can then, in response to detecting the presence of an atypical or malicious device, cause an alert 140 to be generated, which can be provided to a user 102 (e.g., an administrator of a site 108A, a person assigned/owning a Protect) or to another software/hardware system.

One differentiator (of many) between the embodiments disclosed herein and other existing systems is that embodiments disclosed herein can collect data where other systems currently do not and cannot listen. For example, in some embodiments, a large portion of the Protects can be mobile devices, moving together with a person, car, device, or any other protected object they belong to. Thus, whatever location a Protect is moved to, it gathers information in that environment of interest. This means that a large number of Protects move to places where malicious activity might be perpetrated via relatively easy access to unprotected wireless, mobile, or other devices. Accordingly, Protects can collect information and monitor transmissions in locations where no other security-related sensors exist. Thus, the data collected and the wireless activity exposed are not currently available to other security mechanisms.

Moreover, other systems that focus upon one type of wireless transmission protocol, e.g., Wi-Fi, will miss out on other wireless transmission protocols (e.g., Bluetooth or other peer-to-peer protocols). Moreover, in some embodiments where a Protect sniffs multiple wireless transmission protocols, the Protect can detect more sophisticated attacks that may employ these multiple wireless protocols, detect that a device is malicious even though its actions within any one wireless protocol by itself may not appear malicious, as its actions in multiple protocols may reveal malicious intent.

Additionally, some security systems attempt to protect a specific location such as an office, an infrastructure, or an organization. However, mobile devices that perform malicious activity may, for example, move from one place to another, physically carry stolen data between locations, or use information collected at one site to breach other sites. In some embodiments, the presence of many Protects at different locations, not necessarily belonging to the same organization, can increase the chance to expose and discover malicious activity over wireless media by mobile devices. Thus, embodiments can utilize information gathered at one location, whether an office, home, theatre, store, or on public transportation, may help discover malicious activity performed at a completely different location, such as other offices of the same organization.

In addition to exposing attacks, global coverage by many different Protects at many different locations, all reporting to the same central facility, as provided by embodiments of the present invention, may also help to distinguish "true" malicious activity from "false" malicious activity. For instance, consider a new mobile device seen by a Protect in the organization offices for the first time. If this unidentified device starts a "wireless conversation" with the internal network of the organization, this may looks like suspicious activity. Next, the system can check for a false alarm to avoid generating an alarm in that case. False alarms ("false positive alarms") can be eliminated using previously collected information, such as the site where the suspicious device was bought, other locations where it has been seen, its observed pattern of behavior, and so forth (information such as the site where the device is bought can be acquired either from a Protect installed in the vicinity of the purchase, or from external sources of information, such as the internet or retail companies which may be interested to collaborate on security of their offerings). Thus, data collected at other locations, possibly at other times, is of great help in analyzing current threats and avoiding false positives. For instance, if the same device is seen approximately at the same time in two very distant locations, then an alarm can be generated for possible identity theft. Such an alarm is only possible through the wide coverage of a large geographical area by many Protects as provided by embodiments disclosed herein.

Additionally, embodiments utilize a beneficial data collection mechanism. In some settings, the number of Protects can reach millions and even billions, and their family may include dozens of different members (i.e., include heterogeneous types of devices). Because each member of a Protect family can be implemented using a different set of available resources, and because the Protects may encounter different conditions that change over time, the rules specifying the process of data propagation to C3 can be very dynamic and can be specific per-Protect. Thus, these rules can optimize different objectives (e.g., alarm accuracy, valuable data collection, resource usage, and more). The C3 data gathering process, and in particular, optimizing the set of rules for data storage and data propagation, thus provides substantial benefits.

Additionally, embodiments provide another important advantage in that they are "endpointless," meaning that nothing needs to be installed on the protected devices (e.g., cellphones, mobile devices, personal computers, servers, etc., of an organization or individual). Installing expensive security mechanisms on the devices may drive their costs into prohibitive zones. Furthermore, embodiments do not require installation or reconfiguration of hardware or software on existing IT components, such as compute devices, network elements, or storage.

As shown in FIG. 1, C3 104 can be implemented by one or more server end stations 106 within a cloud computing system 110, or "cloud." A cloud can be a data center or collection of data centers that can be used to host scalable services. The cloud can be "elastic" in that it can provide more computing power, storage, bandwidth, and other resources, as needed, to the service (e.g., C3 104) which is running on top. C3 104, in some embodiments, is a service that can be implemented in the cloud, although it may also be implemented in a private data center, sometimes called a private cloud.

C3 can interact directly with the Protects (e.g., via the Internet, cellular network, etc.) or in some embodiments, indirectly via one or more C2s 116. A C2 can aggregate the information arriving from all Protects at a site 108A, and provide this raw information and/or aggregated information (e.g., observation data 128) back to C3. Additionally, C2 can receive control data 126 (e.g., data for filters 120, forensics, etc.) from C3 to be installed or provided to one or more Protects at its site 108A.

The Protects 118A-118M can be implemented in many different ways, e.g., as a watch, a cellphone, a dedicated device, a shoe, a belt, a toaster, an air-conditioner, a television, a car, etc. A Protect can have sensors 121A-121M from which it receives measurements about the environment. A Protect has computational power (e.g., from one or more processors or other circuitry) which is typically smaller than that of a "regular" computer or a laptop. A Protect may communicate with other devices using wireless communication protocols, such as Wi-Fi, Bluetooth, etc. A Protect may be powered by a battery, and thus have a limited power availability (as the battery needs to be replaced or recharged, as opposed to "wired" devices having comparatively infinite power). Notice that the Protect is one type of device, but unless indicated by the context of use, when this disclosure talks about devices it is typically referring to those devices whose communication is sniffed by the Protects—e.g., typical devices 112A, atypical devices 112B, malicious devices 112C, etc. The term "IoT" or "Internet of Things" can be used to refer to many devices that are directly or indirectly connected to the Internet and may communicate (again, directly or indirectly) using the Internet.

As disclosed herein, C3 can compute models based upon the data collected from the Protects. A model can be computed using from the data via machine learning methods. The model can be a compact mathematical way to represent and capture the normal behavior of something. For example, a model can capture the expected, normal behavior of a device, where it will appear, who it will transmit to, what information, how much information, etc. As another example, a model may represent the behavior of the environment of the Protect (as seen in the data collected by the Protect, namely, the wireless transmission behavior as recorded by the Protect). Examples of models and some machine learning methods behind them will be provided later herein.

In some embodiments, C3 can also generate profiles, which are a model of the behavior of an object, usually a device. Thus, a profile can be specific to a particular device (e.g., device 112A), though in some embodiments a profile can be specific to a group of devices.

As shown C3 can, based upon models (and/or other information) generate filters 120A-120M. A filter can be a software module. Embodiments can use two types of filters 120: rule-based filters 122 and anomaly detection filters 124. A filter can be "compiled" by C3 and sent directly or indirectly to the Protects. Some filters may be shared by Protects (i.e., utilized by multiple Protects), and some may be individual (i.e., used by just one Protect). The use of filters can serve two purposes. First, to understand how abnormal or seemingly malicious traffic is an event, or, recorded communication, in order to decide on whether alerts are to be generated. Second, to allow the Protects to filter out normal, or "less interesting" data in order to minimize communication from the Protect to C3. To this end, a filter may also take into account resource availability, as will be described later herein.

A rule-based filter 122 can be compiled out of a set of rules or signatures of known malicious behavior, and can allow the Protect to decide whether the wireless communication that is seen, or related events, should be suspected as malicious, by comparing them to previously seen and well-studied attacks.

An anomaly-detection filter 124 can be compiled out of a mathematical model, and allow the Protect to decide how abnormal (i.e., the degree of abnormality) is incoming data, even when it does not match a particular suspicious pattern (indicated by a rule-based filter 122).

Figure 2:
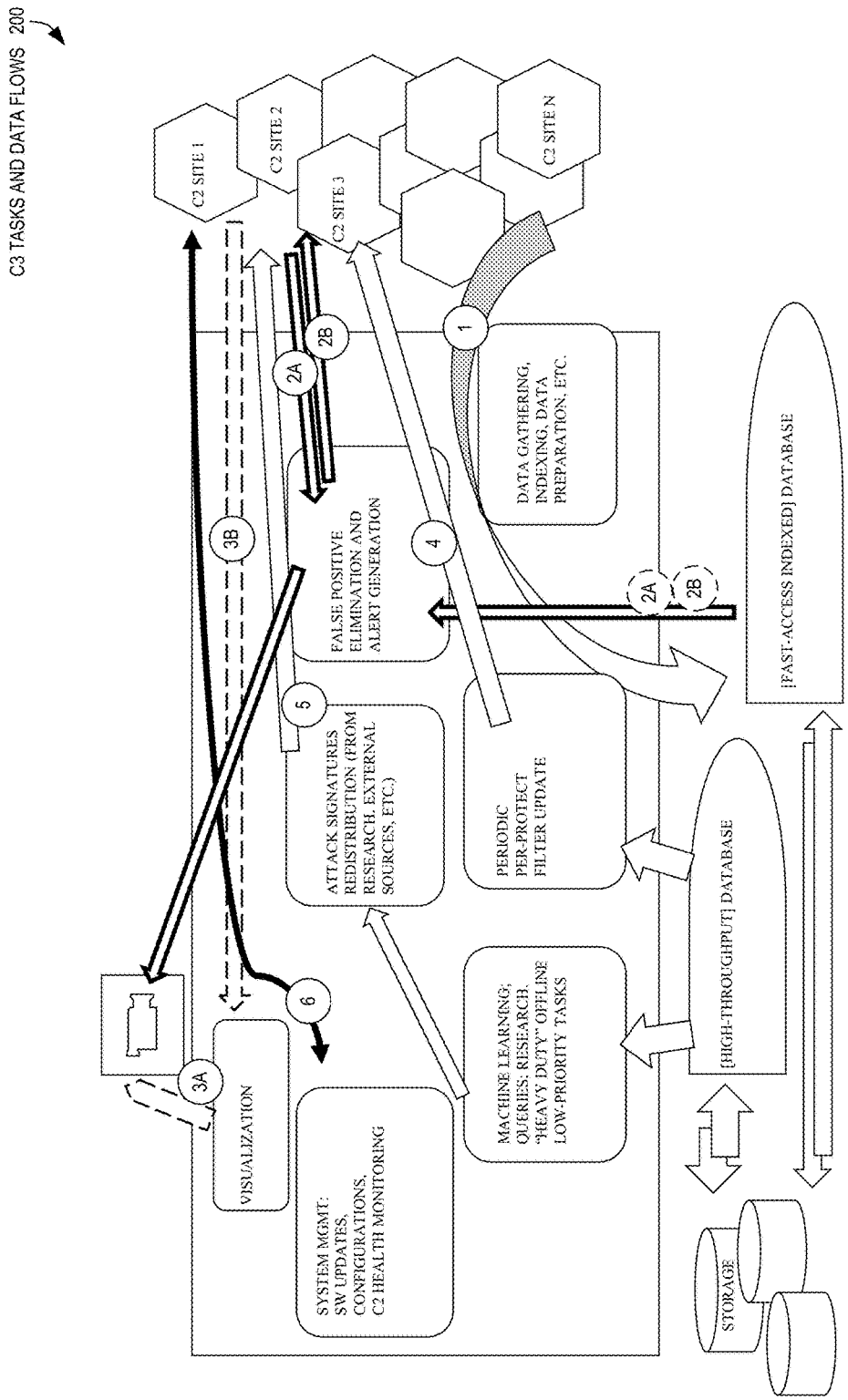
FIG. 2 is a block diagram illustrating exemplary operations and data flows of a C3 according to some embodiments.

For additional detail regarding these entities in the illustrated system, we turn to FIG. 2, which is a block diagram illustrating exemplary operations and data flows 200 of a C3 according to some embodiments. A few of the data flow channels in the figure will now be presented. The data that flows from the Protects to C3 may include:

At circle (1), a periodic reporting of packets, conversations, and statistics that a Protect recorded can be reported as "observation data." At times (e.g., once a day) this reporting can include a collection of records that look relatively normal to the Protect, and may be used to help build/update models and profiles at C3. In some embodiments, data received at C3 can be stored to a high-throughput database at C3 (e.g., for later analytic processing) and/or to fast-access databases at C3 (e.g., to become available for fast operations such as threat verification and anomaly detection).

At circle (2A), alerts may be sent to C3 as urgent communications. Such alerts may be the result of a match to a known attack signature, or may be an anomaly that may indicate an attack. An alert can be an action performed to notify a person, software instance, or hardware device of something. For example, an alert can include reporting information to one or more users via a visual display and/or electronic message (e.g., e-mail, Short Message Service (SMS) message, instant message, telephone call, etc.), causing an audible noise to be emitted (e.g., a noise/sound from a speaker), causing a visual signal such as a light to be generated (e.g., a flash or blink of a light emitting diode (LED)), causing a vibration of a device, etc. C3 may then trigger the false positive elimination and alert generation module which can determine whether further actions are necessary.

At circle (2B), during the processing of an alert, C3 may send queries to Protects located within the vicinity of the alerting Protect at a current or previous time. For example, the false positive elimination and alert generation module at C3 may be interested in what these Protects recorded during the last half an hour, or may ask them to search their recordings for specific events (or for a collection of some all data it has at or around a particular time. The results will be sent back (from the Protect(s)) to that module (of C3) for further consideration.

At circle (3A), a request by an IT manager may be issued from time to time to monitor the status of the system. The system can present the status using various visualization techniques, zooming in on different aspects of the wireless communication activity as seen in the relevant site(s). For instance, the system may show the various devices and their approximate locations, or it may also provide some colored edges of various thickness to indicate on recent transmissions and conversations between those devices. On-line visualization can involve having the continuous flow of the Protect recordings to the visualization module at C3, as shown by circle (3B).

The data flowing from C3 to the Protects may include:

At circle (4), periodic (e.g., daily, hourly, etc.) updates of the filters that are used by the Protects.

At circle (5), newly acquired/determined attack signatures. For example, at one site an abnormal event may occur and be detected by a Protect. After an investigation confirms that this abnormal event was in fact an attack, the data and/or metadata of the event (and/or surrounding the event) can be studied to extract a signature of the attack, which can thus be used by other Protects to detect another occurrence of the perhaps previously-unknown attack. Accordingly, once the signature is known, the new signature can be distributed immediately to the Protects as part of an updated module to detect further incidences of the attack.

At circle (6), C3 may tune, modify, and/or upgrade, etc., the Protect software as needed. For instance, this is required when a security hole in the Protect operating system needs to be patched.

As already shown at (2B), verifying or refuting threats is done by the false positive elimination and threat handling module at C3. That module of C3 may send queries to the Protects, mainly those in the close neighborhood of the alerting Protect, in order to verify that the alert is genuine and true. For instance, if the alert is based on an even or transmission that no other Protect has seen, then it just might be that the alerting Protect is faulty or even malicious.

C3 may have other requests which involve communicating with the Protects. For example, C3 may request on-going real-time propagation of everything recorded by a Protect (or a set of Protects) to provide the necessary data for on-line visualization.

As opposed to the Protects, C3 in many embodiments operates in a "friendly" environment and thus can be comparatively easy to maintain and secure as a non-breached and trusted entity. However, as C3 accumulates the data received from Protects, special hardening, screening, and testing operations can be employed to ensure that this data remains secure even in the unlikely case that one or more of the Protects have been breached.

The data collected by the Protects can include information from captured packets and statistics for packets sent between devices and by devices. For instance, the MAC addresses of the sender and receiver, the amount of bytes received, amount of bytes transmitted, the number of packets, the number of packets of certain types (e.g., management, broadcast, probe-request, data), the amount of encrypted data, the types of encryption, the signal strength, the timestamp, and everything else that inspection or deep inspection of the packets may provide. C3 can process the data it receives from the Protects and make it the input of statistical analyses, including, for example, queries, correlations, general analytics and machine learning algorithms Some of the findings of the analytical processes are communicated by C3 back to the Protects, including, for instance, updated filters for deciding what data to store and what data to propagate to C3, signatures of known attacks, rules for ranking indications of malicious activity, instructions for alarm generation, requests for propagation of stored data, and so forth. For instance, if the analysis of past information shows that a wrist watch device may only communicate with a sister cell phone that moves with it, and suddenly one wrist watch is seen communicating with a cell phone which is not its sister, then this would either match a pattern of attack or (and) would be detected as an abnormal event.

C3 can also reconcile different views of different Protects that eavesdrop on the same potentially hostile devices. C3 is efficiently able to differentiate true positive from false positives alarms when more Protects report to it, covering larger area (the area they listen to), and having more overlap in their respective covered areas. For instance, C3 can tell a Protect that a new device in the area covered by that Protect was purchased in a legitimate transaction a few days ago (as reported by another Protect or by a collaborating retail interested in malicious activity by breached products it has sold). Thus, by reconciling information received from geographically distributed Protects, C3 can filter out false positives, namely, alarms which concern legitimate devices and activity. As another example, C3 can alert to "device identity theft," where one device attempts to falsely identify itself as another. As another example, C3 can consult the neighboring Protects of an alerting Protect in order to verify the alert is true.

In addition to the above activities, which may involve synchronizing data from only a few Protects, C3 can accumulate, index, and store "big data" arriving from all Protects. Using large quantities of data, C3 can discover patterns and routines in the behavior of a single device (e.g., where it goes, when it goes there, what activity it performs there, etc.), and/or even in the behavior of groups of devices. Consequently, C3 can discover deviations from these routines and expose abnormal behavior. When the overall number of Protects increases beyond a few hundred (as it may reach millions and more), C3 can employ sophisticated machine learning algorithms to study patterns and phenomena which emerge in the recorded activity of many devices (i.e., the "wisdom of the crowd") and are otherwise statistically negligible. In this way, C3 can research and discover new, yet unknown types of attacks and hostile activities.

The following activities form a subset of those performed by C3. First, C3 can also perform data accumulation. C3 can receive the transmission of observation data (e.g., data and statistics describing the data and/or observed wireless communications) accumulated by the Protects. C3 can store the data in databases that can support C3 other activities—e.g., a first type that is highly scalable and durable, and can be queried by parallel retrieval and processing software, such as the Map/Reduce paradigm. One such popular database is Hadoop Distributed File System (HDFS). Embodiments can alternatively or additionally utilize a second type of database that is efficiently queried using traditional Structured Query Language (SQL) interfaces, e.g., using multiple indices and/or keys to accelerate focused data accesses.

C3 can also perform threat evaluation. C3 receives potential threats communicated to it by the Protects. Each such potential threat can be examined by a false positive elimination module that will evaluate the probability for a real threat. The false positive elimination module can implement two procedures. A first implemented procedure can consult the previously stored statistics and data, for instance, to answer the question "does the threat involve behavior which is a-typical to the device?" For example, a device which used to send only a few dozen bytes every day but today sends ten times as much, or a device which is sending a lot more bytes than other devices of the same type and manufacturer. A second procedure that can be implemented may consult "nearby" Protects that have an overlap of coverage (e.g., a region from which communications activity can be detected by multiple Protects) with the threat-generating Protect; for instance, the threat may be a result of a buggy or a hacked Protect, in which case nearby "healthy" Protects can provide the required evidence.

C3 can also rebuild the filters. C3 can perform a periodic rebuild of the models and, in turn, the filters compiled from those models, which are in use by the Protects to take decisions about important events and data, whether to propagate them to C3, and whether to see them as indications for attacks (this is a complicated decision that depends on the extent to which the event is abnormal and the severity of the indication for malicious activity). The filters can be rebuilt when new data becomes available due to shifts and drifts in the activities in the respective areas covered by the Protects. For simplicity, this task could be performed once a day for every Protect, though other schedules can certainly be used. The filters can be built using algorithms from the realm of machine learning, and using observation data collected from Protects as described above. As the filters can be built using the Protects' respective data, hence each Protect can employ its own individual filters that are tailored to its particular environment and routine, though this need not be the case in all embodiments. For example, when the number of Protects grows, separately computing filters for each and every Protect can become a very heavy task. Thus, the filters accuracy as well as the periodicity of filter reconstruction can be changed according to infrastructure scalability.

C3 can also perform security research by supporting a research team whose task is to search the data for new insights and signatures of malicious activity. The tasks performed by the research team typically involve sophisticated learning as well as heavy data search and manipulation processes. Such research may also include various data mining and/or machine learning techniques useful for identifying unique aspects, or signatures, of the malicious activity. C3 can also perform system maintenance. C3 is in charge of the overall health of the system, and to this end, it can monitor the Protects and the sites to discover signs of malfunction, in which case it takes the necessary corrective actions.

C3 can also perform robustness operations. Just like every other center of operations, C3 itself can perform operations to ensure that it is not a single point of failure, by managing its own scalability, stability in the face of failures, resistance to attacks, data consistency, etc.

Figure 3:
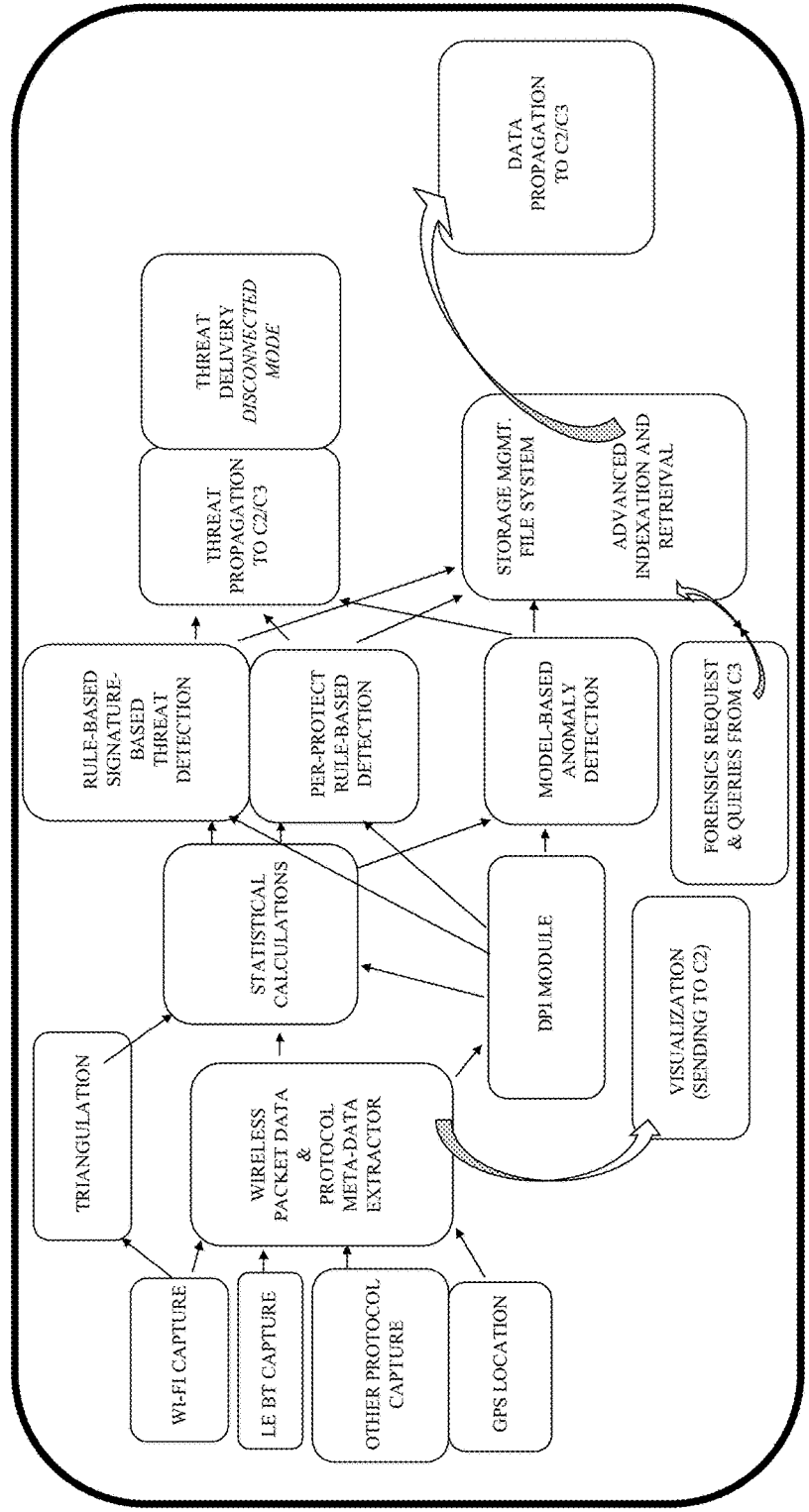
FIG. 3 is a block diagram illustrating exemplary operations and data flows of a Protect according to some embodiments.

We now turn to a description of the Protects. FIG. 3 is a block diagram illustrating exemplary operations and data flows of a Protect according to some embodiments.

A Protect communicates with C3 as needed but can be otherwise "hardened": while its hardware may or may not be purchased "off the shelf," its software layers and willingness to communicate with the outside world can be purposefully severely restricted to reduce its vulnerability to being exploited/compromised. For example, a specific "stripped down" version of the Linux operating system could be used, most communication ports could be closed, or honey pots could be installed to capture invasion attempts. The design makes it very difficult for a cyber-malicious activity to breach the Protect, to the extent that the Protect becomes a "trusted entity" and cannot be utilized for attacks. In particular, the upgrades and security patches that may be required from time to time can be performed on a very selective basis, as a trusted process managed by the administration section of C3.

A Protect listens to communication in an environment where it can follow wireless and sometimes even wired transmissions. It may also have a Global Positioning System (GPS) unit to locate itself in space. Thus, the Protect may define at least one area, called a "cover zone," where it follows all communication activity, and in turn may verify that this activity is benign. A cover zone may be larger or smaller, according to the strength of the Protect, a type of wireless communication protocols associated with the cover zone (e.g., a Bluetooth LE cover zone may be smaller than a Wi-Fi cover zone of the same Protect due to the range of communications of these protocols), and/or the environmental conditions in which it operates. Redundancy is useful: Protects may monitor overlapping areas, thus moving more data to C3, providing stronger evidence, by means of which it should be easier to differentiate malicious from benign activity. In general, the greater the number of Protects that are deployed, the larger the geographical area that will be covered and the larger the data that will arrive at C3 for analysis, further strengthening the system's ability to identify and thwart malicious activity.

The Protects family of devices can be diverse. Some Protects may have more compute power, storage, memory, communication bandwidth, energy availability, etc., and some may be restricted by a lack of—or low availability of—those and other resources. Thus, some types of Protects can collect, process, and propagate to C3 more data than others, and can monitor a larger cover zone than those that are thinner and resource-bounded. Some Protects may rely on a strong and stable electricity source, while others may be battery-operated and mobile. Some Protects may have cellular capabilities, while others may not. Some Protects may tap into wired communication, while others may only listen to specific wireless mediums. Some may be too heavy to carry, while others may weigh only a few dozen grams and be fully portable. Some Protects may thus be more expensive than others.

For example, a small, battery-operated Protect may be carried by its owner at all times, constantly listening in to that person's environment. Any hostile device in the area monitored by this type of Protect will not be able to communicate with other hostile devices without the Protect listening to this interaction and reporting it. The monitored area will become the "safe zone" of the individual who carries the Protect. The safe zone moves with the device's owner everywhere she goes: office, home, airport, dinner, etc. It continues monitoring the (mobile) safe zone even while the individual is asleep. This means that the personal Protect will move together with its owner to places where no other security sensor exists.

The same applies to a possibly "stronger" Protect belonging to a car, or to any other mobile object where wireless sensing for security purposes is needed but is currently not available. In the case of the car, the provided safe zone is larger, as the car battery or engine is the power source in this case, and the resources available are much more powerful than those of the personal Protect. An even larger safe zone may be covered by an electricity-powered Protect that taps into the office Local Area Network (LAN) and monitors the office wireless activity.

Many other types of Protects may be utilized in addition to (or as an alternative to) the abovementioned examples. Similarly, the types of wired and/or wireless monitoring and data collection and propagation may also vary accordingly. However, Protects are built for the specific purpose of collecting data with as large geographical coverage as possible. Thus, despite their diversity, in some embodiments Protects have common features and perform common processes:

Each Protect can be hardened to protect itself against attacks. To further increase security, a Protect can run special-purpose software layers, such as trusted versions of the operating system and runtime libraries.

When C3 is reachable through communication channels, the Protect can be capable of communicating with it. When C2 is available, the Protect may communicate with it and not with C3, as described below, though this need not strictly be the case. Thus, even with a C2 available, a Protect may still communicate with C3, or a Protect may communicate with both the C2 (e.g., for observation data reporting) and C3 (for system updates, urgent queries, etc.).

A Protect having a certain wireless communication capability may listen to communications of other devices in the environment that use the respective wireless medium. Exemplary wireless protocols include Wi-Fi, Bluetooth, Bluetooth LE, Zigbee, cellular channels such as Global System for Mobile Communications (GSM), Code division multiple access (CDMA), etc. While each protocol may have its own examples for malicious activity (e.g., a device may start using a control channel for moving data, which is more likely to happen in some protocols than in the others), other indications are general for all protocols (e.g., an unusual amount of data is sent by a device).

Each Protect can analyze the communication it overhears in real time according to instructions it receives from C3. The purpose of the analysis performed by the Protect is to identify threats and hostile devices. To this end, the Protect uses the filters provided by and periodically updated by C3, in which the instructions how to perform the analysis are programmed.

Each Protect can use several parameters to decide what to do with recorded communication. The parameters are whether there is a direct request from C3 to record specific events over specific time period, the extent to which the communication event is abnormal (as determined by the filters), the resources available at the Protect (e.g., the bandwidth available for communicating with C3), etc. Even in the case of normal, seemingly benign activity, the Protect may attempt to temporarily store the communication it hears for the case that a later investigation is requested by C3 (but this may sometimes not be possible, depending on the available resources and storage space available). Sometimes, especially when there is too much to store, the Protect may store only part of the communication, using instructions it receives from C3 in order to filter in the data to store and filter out the data to discard.

Each Protect can propagate to C3 (directly or indirectly via C2) the identity of other devices in its environment and/or digests of the communication it overhears. Even digests may be too large to send all the time: the filters are used to decide what is important to send back to C3 and what's not.

When a threat is identified by a Protect, the Protect can generate an alert, which is propagated to C3 where it is verified. If the alert looks like a true positive, or if more checks are required using human intervention, then an alarm is generated by C3 and is announced (in a configurable manner) to a designated security officer.

FIG. 3 depicts a schematic view of one possible architecture of the Protect, where the Protect collects from Wi-Fi and Bluetooth LE. Notice the data in the Protects flows from the sensors on the left, to filters, and then to storage and/or propagation.

The triangulation module is described later in this document. However, the meta-data extractor receives as its input the packet (or frame) from the capture modules (Wi-Fi Capture, Bluetooth LE Capture, Other Protocol Capture, etc.). It then extracts packet fields from the packet, such as packet type, sender, receiver, signal strength, packet data, etc.

The Deep Packet Inspection (DPI) module takes as input the packet data extracted by the meta-data module. It attempts to further extract fields that are part of the packet data, however are also part of the meta-data of some higher-level communication protocol (e.g., HyperText Transport Protocol (HTTP)). Sometimes, especially when the packet data is encrypted, DPI may be impossible.

Once the packet fields are known, some initial checks by the signature module and the anomaly detection modules may already process them. For instance, if the packet sender is a wrist watch and the receiver is a phone which is not paired with that watch as belonging to the same person, this may trigger an alert by the either the signature module (if a corresponding rule was written by C3), or by the anomaly-detection module (as this pair of devices were not previously observed to communicate).

The basic statistics calculator takes as input the packet fields extracted by the meta-data and the DPI modules. It then modifies the basic statistics accordingly. For instance, suppose this is a management packet, then the statistics for such packets (e.g., a count) can be incremented by one (1). Similarly, the statistics/count of management packets between the sender and receiver of the packet can be incremented. Another example is the modification of the average packet data size.

Periodically (e.g., every 10 seconds, 30 seconds, 1 minute, or another practical time period selected based upon the particular environment of use and/or the preferences of the operator), the statistics vector can be output from the calculator and sent as input to the signature module and the anomaly-detection module. Once again, certain statistics (e.g., amount of transmitted bytes or packets) may trigger an alert by the signature module. Similarly, they may be detected as outliers by the anomaly detection module.

Once a potential threat is detected, the threat propagation module will be in charge of communicating it to C3.

In case that the Protect is disconnected, it may be possible to trigger a local alert using the threat delivery module.

Even if the packets or statistics do not trigger alerts, and even if they may not be sent immediately to C3, they may still be saved temporarily in local storage by the storage unit.

This can be done for the case that a forensics request from C3 is received, asking for all data recorded over a relevant time period.

Figure 4:
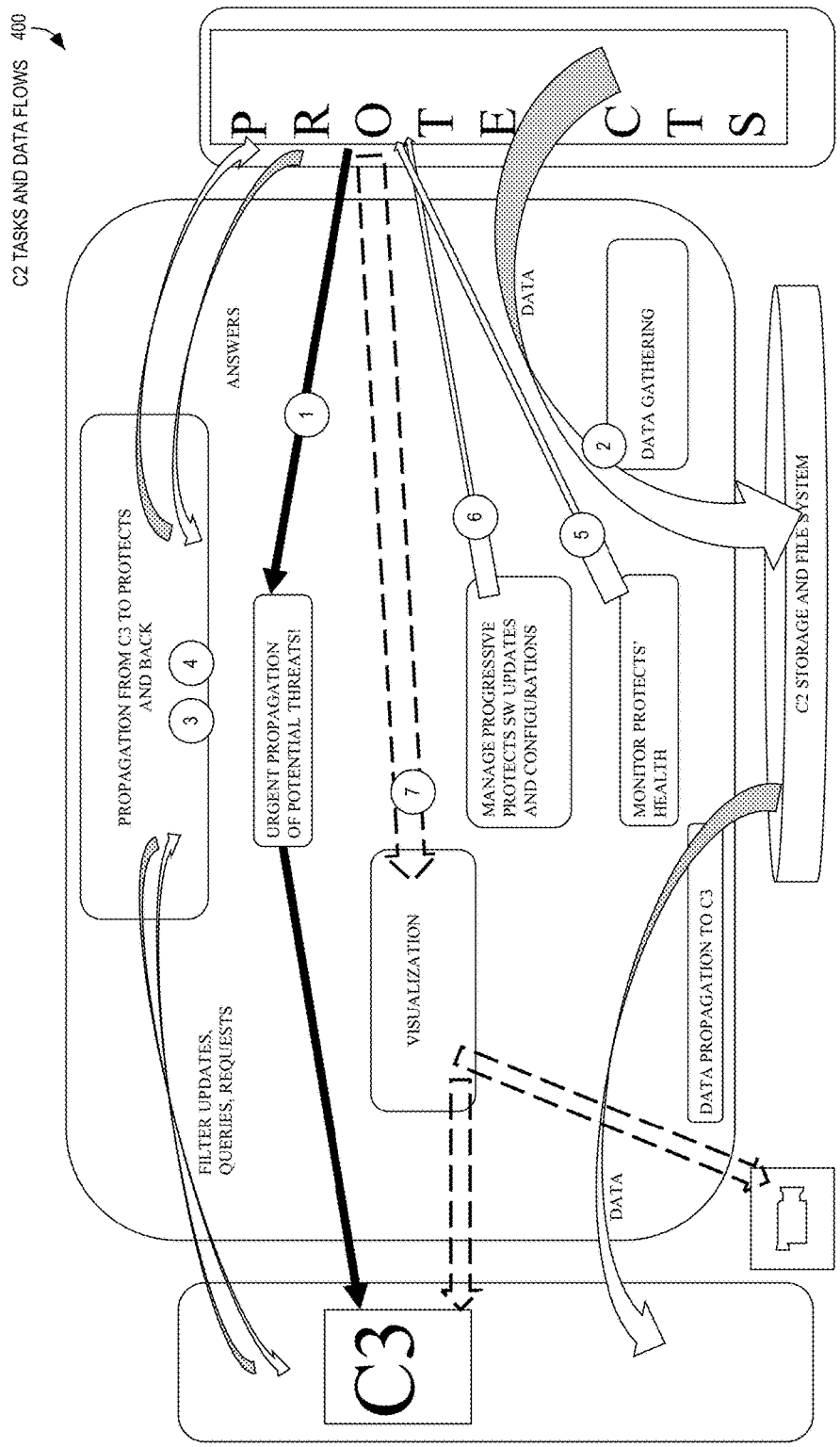
FIG. 4 is a block diagram illustrating exemplary operations and data flows of a C2 according to some embodiments.

We now turn to an overview of the C2 (or "aggregation module"). FIG. 4 is a block diagram illustrating exemplary operations and data flows 400 of C2 according to some embodiments.

Not all Protects may communicate with C2. For instance, a mobile Protect may typically communicate directly with C3. However, many sites composed of dozens of stationary Protects may typically use one or more C2 units to help them connecting with C3. C2 may be composed of a server end station, a personal computer, etc., with enough memory and compute power and bandwidth to C3 so that all Protects in the site will be able to communicate with C3 using C2 as a "relay". In fact, in the case of non-mobile Protects, C2 may become the only channel using which Protects can communicate with C3. If redundancy is required for the sake of robustness, several C2 units may be installed at a site.

In some embodiments, the highest priority for C2 is to propagate to C3 urgent threat detection announcements by any of the Protects in the site, as shown at circle (1).

At circle (2), the Protects may use C2 for storing data that is to eventually be communicated to C3. This includes events and digests that do not indicate of a threat but may help C3 in generating a more accurate model of the Protect environment, or of device profiles. Such data will typically be sent to C3 in a bulk when C3 will free enough capacity for its processing.

At circle (3), C2 may communicate, to the Protects, modifications sent by C3 such as new signatures for malicious activity, new filters, etc.

At circle (4), C2 may communicate to the Protects queries and requests sent by C3, and will communicate back the replies—e.g., when C3 solicits more information to determine the validity of an alert sent by one of the Protects.

At circle (5), C2 can be in charge of monitoring the health of the Protects in the site. This can be done using frequent "I am alive" messages sent from the Protects to C2. C2 may also initiate testing tasks to be performed by every Protect in order to provide further evidence on the Protects' health.

When upgrades or modifications are required to the Protect software, C2 will be in charge of this operation at circle (6).

At circle (7), C2 may collect from relevant Protects all the data required for on-line visualization, when utilized. When observation is done on premise, then C2 can present the data at the local site. If the visualization operation uses C3, then C2 may simply propagate the data to C3.

Collection, Storage, and Propagation of Data

Protects can store the data they collect before moving it to a central location (e.g., to C3) for processing and analysis. The data stored at the Protects may be limited by space restrictions; however, moving all of it to C3 requires high overhead and dedicated resources, such as CPU, memory, bandwidth, and power. This is in addition to the resources required at C3 for processing vast amounts of data. Thus, if all the data accumulated at the Protects is propagated to C3, the infrastructure may become very expensive—or even too expensive—to construct. On the other hand, it is the task of the Protects to collect data from their respective environments (e.g., wireless transmissions) and move important parts of that data to C3 for analysis and alert generation. Hence, it is crucial to lower the overheads to a minimum, and in particular, the communication volume between every Protect and C3. However, this cannot come at the expense of the monitoring accuracy. Namely, the alarms are still be generated by the system with very low latency (the time elapsed from when the monitored event occurs to the time when a corresponding alarm is generated), and as few false positives and false negatives as possible. Operations for lowering the communication and storage space without reducing the accuracy of the system are described below.

As noted earlier, devices of the Protect family may be large, wired, and resource-rich. On the other side of the scale are family members that are smaller, lighter, and cheaper, with far fewer resources and power. Whatever the Protect device capabilities are, the data collected may go through several filters that take various parameters into account. The goal of the filters is to identify important data that C3 can use for its analysis. Such data is communicated to C3 (or stored until communication channels are available), while less important data is ignored (see below regarding the classification and evaluation of data).

The filters and the decisions they result in can be elastic and flexible. We now present an example of a set of decisions taken by the Protect using the filters; the description assumes a direct connection of Protects with C3, but can be generalized to the architecture which includes C2 in a straightforward manner.

Monitoring and Alarm Generation.

If the filter indicates the data is highly indicative of an attack, or urgently required at C3 (e.g., for refuting attack indications received by C3 from other Protects), then the Protect device may immediately send it to C3. If the Protect device currently does not have the resources (e.g., energy, bandwidth, connection, etc.) to propagate the data, then it may store it until a time when an appropriate channel becomes available.

Data Collection and Storage.

Consider the case where a new device (e.g., an atypical device 112B) is detected in a Protect environment. In this case, even if the filters for that Protect have been stable and efficient for a long time, it may now be important to collect data relevant to the new device (e.g., its routines, its type, its permissions, with whom it communicates, etc.) in order for C3 to revise the filters accordingly. Thus, in some embodiments filters are modified from time to time, even when there is no malicious activity. When it is important to send the data to C3 for offline study, but it is not possible to send it immediately, then the data can be stored on the Protect device (or if available, at C2) until the resources for such transfer become available. The filter that makes this decision may take into account the size of the storage available at the Protect device and the prospects for later resource availability. For a mobile Protect, it may also take into account the energy needed for storing and retrieving the data.

Discarding Data.

Most of the data received and examined by a Protect is classified by the Protect filter as routine and normal. Most data do not indicate a threat, nor do they reveal new devices in the Protect environment or new activity of already-known devices. Because of storage, power, bandwidth, and other resource limitations, such data is typically discarded in some embodiments, as it does not contain interesting signals and is of no importance to offline analysis and machine learning algorithms. For backward analysis and forensics, in case it is requested by C3, such data may be kept at the Protect for a short time after it is recorded, before it may be eventually discarded for good.

Prioritizing Data.

Sometimes the data stored on the Protect for later transmission has some potential value but there is newer incoming data with higher potential value. The filter can prioritize, and replace current data with more important captures (prioritization is included in the filters; see filter construction discussion below). To this end, the filter can keep an efficient and accurate account of the data currently stored on the Protect device, as well as the location where it is stored. This information may be kept in volatile cache; doing so has the advantage of not requiring that resources be invested in storing the information persistently, but risks losing it if the Protect is turned off or loses power. The priority information for the stored data items may also be stored persistently, in which case storing and reading it require that resources be invested.

Discarding Low-Relevance Data.

Availability of data with some relevance can be reconciled with resource availability (storage space, energy), and with the prospects of acquiring data of even higher relevance before there is a chance to move the lower-relevance data to C3. If the prospects for acquiring more relevant data are high, then—even if storage space is still available—it may be beneficial to discard potentially relevant data given that the filter can classify the data as low-relevance. The way resource availability and demand are predicted is described in the filter construction section below.

In addition to the logic they implement for identifying high-valued data and events, in some embodiments the filters also adhere to the following constraints (once again, we assume direct connection of C3 and Protects, however, generalization to the case where C2 exists in the architecture is straightforward):

(1) Communication Minimization.

The communication volume between the Protect devices and C3 is to be kept to a minimum. The main reason for this is the amount of resources that have to be invested in communication. The bandwidth that these transmissions use is sometimes a scarce resource (this may change from time to time, according to the environment). The CPU cycles for encrypting the transmissions and for handling the communication stack pose significant overhead, which is in direct relation to the communication volume. The privacy of the captured sources might be jeopardized if too many of their transmissions are exposed. The energy used for communication is substantial (and may change from time to time, according to the environment).

(2) Minimizing Overhead Complexity.

The filters can be continuously evaluated against each and every data item that is collected. This means that high-complexity filters will pose high overhead, which becomes prohibitive when there is too much data (transmissions captured) to evaluate, and it is impossible to apply the filter to all of it. A high-overhead filter also wastes a lot of energy. In the case of a battery-operated Protect device, this may also become a primary restrictive factor Minimizing overhead in filters of data-streams can be accomplished through a cascaded architecture. The first filter in the cascade is of lowest complexity and uses simple logic, whereas the next filters apply increasingly smarter considerations on decreasing amounts of data. For instance, the first filter may check simply that all data collected belongs to a set of known and well secured devices. If this is the case, there is no need for further filtering. A small fraction of the data collected will proceed to the next filter, which may check, for example, deviations from expected level of activities. The series of filters continue, where data which makes it to the final filter is likely to trigger an alarm.

(3) Sleep Mode.

In the case of an extreme energy/power shortage, it may also happen that much of the available data will not even be looked at by the device, and transmission capture will have to be stopped.

Predicting Resource Availability

As mentioned above, most of the time, resource availability and demand can be predicted well in advance, and taken into account for deciding on how to treat data. The idea is to use the periodicity of the Protect resource availability and demand across time. Certainly, on normal working/weekend days, the resources will be used similarly during the same hours of the day. To this end, a learning mechanism can collect historical data of resource availability and demand and provide a predictive model. Some important resources are as follows.

(1) Power.

A wireless Protect that is constantly listening to the environment needs to be periodically charged (or have its battery replaced). However, the operations of filtering captured transmissions, storing them, and propagating them to C3 consume much more energy than the reception operations. As described above, these operations can sometimes be postponed, especially when it can be anticipated by the Protect logic that a power source will become available shortly. Since most days are periodical, it is normal that a power source becomes available at certain times of day, say, during sleeping hours. Thus, the Protect logic may schedule energy-heavy operations according to the projected availability of a power source. This is true especially for communications with C3, data propagation, and C3 updates. The scheduling can also take into account other parameters mentioned, such as data prioritization and bandwidth availability.

(2) Bandwidth.

Similar to power availability, bandwidth to C3 may be restricted at times. Bandwidth-related restrictions will usually be preferable to power-related restrictions, because bandwidth is normally available at home, at an office, and even on the street during the day. However, bandwidth availability is still an important factor, in particular for moving large quantities of potentially-valued data to C3 for deep analysis and security-related signal searching operations.

(3) Input Data Stream.

In making decisions on using resources and storing data, the Protect logic can take into account the volume of valuable data that will arrive as input within the next time period. Usually, the peak times will occur during the day, in office or on public transportation, or at social events such as lunch. For example, weekends may typically be very slow on data captures. A good predictive model can anticipate peak data arrival times and their duration.

(4) Other.

A good predictive model may also anticipate various other important parameters, such as the wireless transmission medium, the sensitivity of the data captures, and the number of false alarms (e.g., during a metro ride).

While the predictive model is encoded into the filters logic for decisions concerning handling data storage and data communication it is constructed at C3 using data collected over time. In some embodiments, data collected by a specific Protect over several weeks, taking into account also a holiday calendar, will be sufficient for day-to-day prediction of resource availability for that Protect.

The more resource-constrained the Protect is, the more important it is to accurately predict resource availability. Constructing a predictor can be as sophisticated as thoroughly analyzing all the historical data of resource availability for that protect. Indeed, such thorough analysis will be important for some fraction of the Protects, in the hope that some periodicity or other patterns can be found and used by the predictor.

In contrast, considering the common schedule of weekdays and work hours (or school hours, etc., also taking holidays into account), a simple and efficient periodicity predictor may exist for the vast majority of Protects. Finding it may require using data collected over a period of several weeks. During the training period, for each resource (e.g., bandwidth, power, storage) and for each resource demand (e.g., received data, fraction of valuable data), the value is recorded. If the variance of recorded values during same time of day is small, then the predictor can work as follows: to predict resource availability within the next—say—hour, the predictor could take the average value of that resource as recorded by historical data during that hour. To take into account that the data recorded in later weeks may be more relevant, the predictor could use some method of "dimming out" the data recorded in earlier weeks, data which may become obsolete. One effective way of dimming out older information uses a weighted average of recorded values with smaller weights for the earlier weeks.

One way to use a lot of data to compute predictors using decision trees is described in detail later herein.

Figure 5:
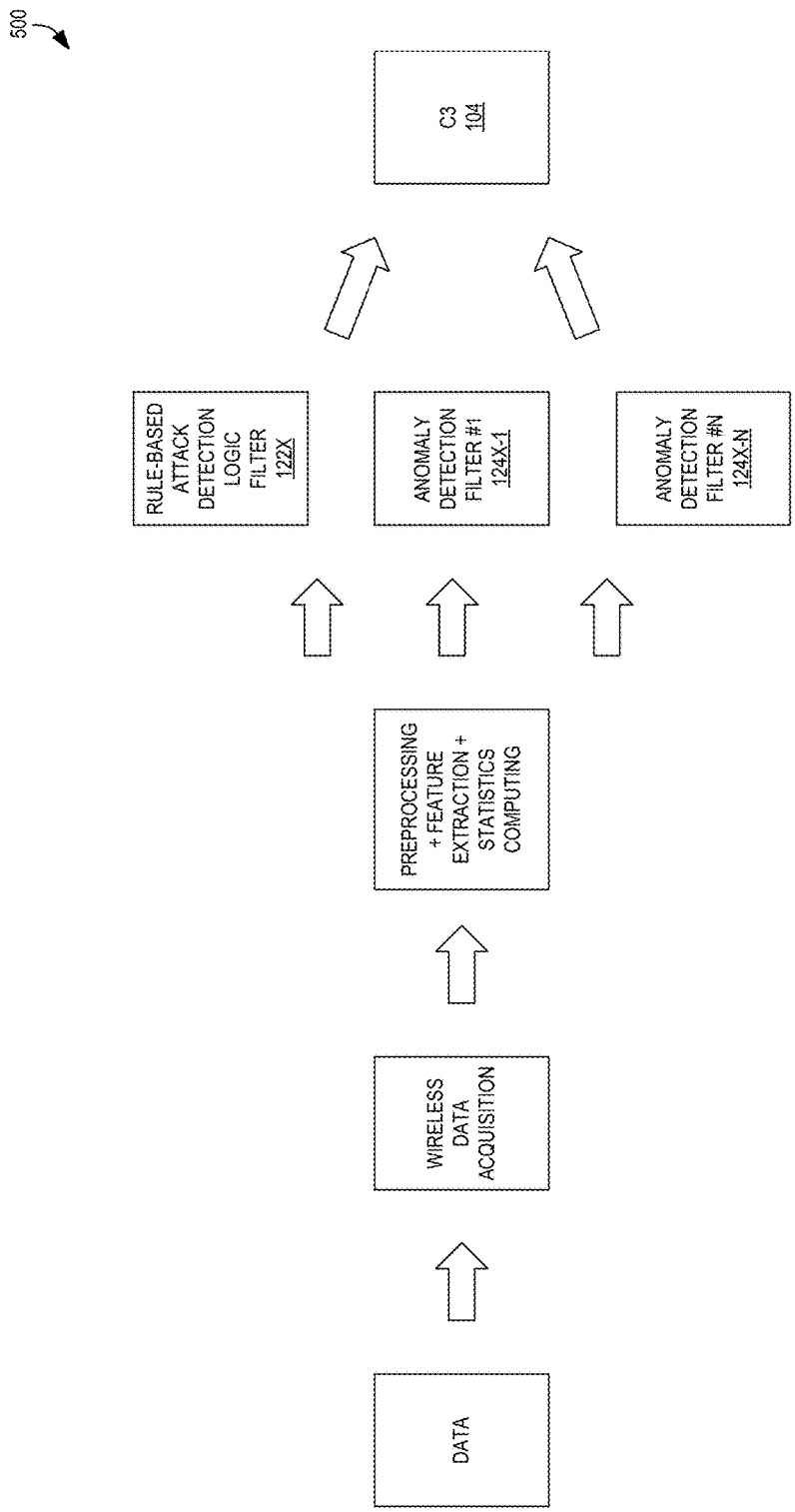
FIG. 5 illustrates a high-level view of attack detection and anomaly detection operations performed by Protects according to some embodiments.

FIG. 5 illustrates a high-level view of attack detection and anomaly detection operations 500 performed by Protects according to some embodiments. As data is transmitted as wireless communications activity, it is received (or "acquired") at a Protect, where it is preprocessed, feature extraction occurs, and statistical measures are updated. Next, one or more of the filters can be applied to this activity—e.g., rule-based attack detection filters and/or anomaly detection filters. If the application of these filters to the data results in an attack being detected or another anomaly occurring, the triggering filter may cause the data to be sent as observation data (or an alert) back to C3.

As described throughout, in some embodiments C3 collects and processes the information that arrives from the Protects. C3 uses this information to build models and compile filters from these models to be deployed in the Protects. In some embodiments, different filters are compiled for different Protects. Given all the data received from a certain Protect, C3 may generate several different filters for different purposes. For instance, one filter may be in charge of deciding on deviations from normal behavior by specific devices detected in the Protect vicinity, another may be modeling the full Protect environment, attempting to detect deviations which depend on more elements in the "big picture" than just a single device's behavior. Accordingly, several filters may be built by C3 for each individual Protect, filters which can be built using the data coming from that Protect.

The filters help the Protect decide what to do with newly-arriving sniffed data, and also whether to propagate it back to C3 as observation data (e.g., in raw form, in a digest form, as part of a statistical data). Naturally, this means that the filters reside at the end of the "data flow" in the Protect.

More precisely, the filters can be periodically (e.g., every day) and/or individually (for each Protect) built by C3 using the data collected by that Protect. These filters have two uses. First, threat detection—i.e., help the Protect distinguish between normal, routine events, and abnormal events that may be indicators of threats. Second, resource economy—i.e., help the Protect select "interesting" events that may be beneficial to take into account when building future filters; thus, sending those events back to enhance the filter construction process is beneficial, while sending others merely wastes resources.

Threat reduction is used by the Protect to find threats which the system did not meet before, or, for which the system does not have a well-defined signature. Resource economy helps reduce the amount of traffic from Protects to C3, which helps reduce the "cost" of the system. One example for the role of a filter regarding resource economy happens when the data is not stable and a drift occurs in one or more of the features, e.g., when new people with new devices start arriving at a location (e.g., an office). Interestingly, despite these different goals, conceptually, both threat detection and resource economy are quite similar, as they both essentially look for outliers in the newly-arriving data.

When an outlier is detected, for most tools used to construct the filter (see several examples described below), the output can be a probability (e.g., a value between zero (0) and one (1), which can indicate a likelihood of certainty) that the event tested or the statistics collected contain some anomaly that, in turn, may present a threat. For example, if the model is some geometrical subspace separating the normal space from the abnormal one, then the distance to that subspace usually defines a probability distribution for the abnormality of the data in question. The level of certainty that there exists an anomaly in the new data determines the urgency in which this data should be notified to C3. A high probability will define an urgent, potential alert, whereas a lower priority may be classified as a result of a small data drift that may be beneficial for C3 to take into account next time it computes the filter, and is thus stored for offline propagation to C3.

The thresholds that separate these can be tuned and optimized over time by the system to minimize Protect false alerts that C3 needs to pay attention to, while not missing true alerts. This can be done individually for each Protect, using the data it collects and its expected deviations. For instance, a simple method may decide on X standard deviations from the mean value that are allowed for a certain feature (e.g., number of bytes sent out by a certain device during 30 seconds) before it is considered abnormal. The higher X that is selected, the lower the number of potential alerts suggested by the listening Protect to C3. The higher the deviation above X, the higher the certainty for potential abnormality in the data.

Data points include detected events such as device arrival, data transmission and statistics of transmissions, and enrichment of the above with further data (e.g., device type of the sending device, etc.). As one example, a data point may refer to a period in seconds (e.g., 30 second), and include the amount of bytes submitted by every device in the neighborhood, the amount of bytes received, the number of packets sent/received, the number of probe-request packets sent/received, the number of management packets sent/received, the maximum/minimum/median/mean/standard deviation/etc. number of bytes in the received packets, the 10% percentile, 50% percentile, and 90% percentile of the number of bytes in a packet, the number of devices of different types/manufacturer, the above for each protocol (Wi-Fi, Bluetooth, Bluetooth LE, Zigbee, GSM, etc.), and many more features. Thus, every feature is a value, or a type, and the data point is a vector which is a collection of all features. Typical sizes for the feature vector can include dozens or even hundreds of values.

Below we distinguish the input data that is available to the learning algorithm, which we call learning data, from the newly arriving data points that are tested for abnormality, which we call test data points. Data points (either learning and testing data) are collected from the output of a Protect—the learning data is collected over time and periodically is used by C3 to train a new model, whereas the testing data points are tested one at a time at the Protect for abnormality, or in other words, for being an outlier. The process proceeds, individually for each Protect, as follows:

The old filters are used by the Protect to classify the input stream of testing data points as one of the following:
- (A) Normal data points—these can be discarded after been kept for a while to ensure that they are not needed. For example, they might be needed later on for a forensic investigation into the circumstances of a future abnormal event. The typical time for saving them can depend on the resources available for the Protect and how likely they are to be required for an investigation. For example, an hour or two may be long enough to make sure they can be discarded.
- (B) Slightly or moderately abnormal data points—these can be saved for propagation to C3 when bandwidth and resources are available for such communication operation.
- (C) Abnormal data points—these may indicate a threat, and should be propagated urgently to C3.

C3 receives the points of types (B) and (C), and then makes a decision whether to generate new filters for the Protect, where these newly received points join older data as training input points. In some embodiments, this happens in either of the following cases:
- (A) The increasing flux of points of type (B) or (C). In particular, (C) points that are found by C3 to be false positives indicates that a shift in the data happened so that the filters need to be modified accordingly.
- (B) External information received which include examples for newly encountered/learned attacks. Such data may arrive from experiences of or points collected in other Protects, or from input which is external to the system.
- (C) Enough time passed since the last rebuild of the filters, so it is time to refresh them. The time here depends on the resources required at C3 for periodic filters generation for all Protects. It can also depend on how long the specific Protect has been gathering training data points. New filters may be generated more often for newly placed Protects for which previous filters may have been generated with insufficient volume of training data.

Thereafter, C3 pushes the newly generated filters to the Protect, which begins using them to process sniffed communications activity.

Learning normal activity models for each Protect can differ for different days and hours in the day, as the data collected as a learning data can differ significantly. Thus, C3 may train different models for different learning data collected at different days and times of day. For example, one may have different models for workdays and holidays, for different hours during the day. A model of activity for 9 am on a workday will obviously differ from a model for 9 am on a holiday, or 12 am for a workday. A drift in the learning data (as shown by the volume of abnormal tested data points, as described above) will typically impact only one or two of the set of a Protect's models, e.g., when one of the workers starts to bring in food from home instead of going to the dining room. But it may also differ in a large part of them, e.g., when new devices such as a wireless printer are installed in the office.

Exemplary Machine Learning Techniques for Model Generation

There are many machine learning tools that can be used in the two-tier configuration disclosed herein to generate the models used for filter compilation. In particular, nearly any well-known clustering technique or outlier detection method can be used. Different algorithms may be used to generate different models for the same Protect using the same learning data collected in that Protect. Different algorithms may also be used to generate different models for different Protects using different sets of learning data which were collected in the respective Protects. Several examples will now be discussed; it is important to note that these are merely examples, and other relevant methods abound.

Accordingly, it is be to understood that different embodiments can utilize different ones of the example techniques/algorithms presented below (or other techniques/algorithms known to those of skill in the art), either individually or in combinations. For example, multiple of these techniques could be used together as an ensemble, where each constructs a different model in testing the same data points. Also, different algorithms could be used to generate different models for different Protects in order to match specific models to testing data that looks different in different Protects. Accordingly, data that is gathered may go through a variety of types of processing/filtering at C3 while the Protects use the filter(s) compiled from the model(s) that result from use of the algorithms.

One example algorithm that can be used for model generation is from Google™ TensorFlow. Tools in this library can be harnessed for implementing outlier detection model to identify important events, as explained above. This can be done, for example, using the "wide and deep neural networks" tool, or "convolutional deep neural networks" tool in the Google TensorFlow library.

In one embodiment, the neural network construction will take as input the learning data accumulated at C3 and use it for tuning network parameters and for learning data representation. Then, the neural network model may be sent from C3 to the Protect. In turn, the Protect will use the network to detect outliers of the testing data points. Training takes place on the cloud part (which, for our purposes means C3), where the model that is built is specifically suited to run on low-resource Protect (e.g., the Raspberry Pi 3 Model b). There are parameters such as the depth of the generated network, the number of nodes in each layer, and the network architecture/interconnects that can be found during network construction and optimization. Unfortunately, the neural network technology at this point does not provide good answers as to how these parameters should be chosen. One way to do this is to perform a "parameters swipe," where results of various designs are being tested for optimality until the best design is found. However, as this is a cycle-consuming task, it is commonly performed in parallel on many machines as well as on highly-parallel fine-grain platforms such as GPUs.

Models based on neural network models may be too large to fit in a Protect of low resources. When the network is compressed by reducing its size its precision and accuracy are hurt, which presents a tradeoff. Some recent ideas in the literature describe how to reduce the size of the network while attempting to keep its accuracy as high as possible. For example, a recent paper entitled "*Sparse Convolutional Neural Networks*" by Liu, Wang, Foroosh, Tappen, and Pensky, presented at Computer Vision and Pattern Recognition (CVPR) 2015, presents a method that can be used to compress the network such that it could fit inside such a low-powered device.

Another example algorithm that can be used for model generation is referred to as Diffusion Nets. Diffusion Nets can be used to identify outliers using complex high-dimensional data sets while using poor-resource environment such as a Protect. To find outliers, two steps can be utilized. The first step uses a well-known non-linear clustering method, called Diffusion Maps, to recognize manifolds in high-dimensional space. A diffusion map reduces the dimension of the original space, preserving only the "meaningful" dimensions by moving to eigenvector space. In many types of data, this transformation reduces the dimension considerably, thus making learning operations and observations much more efficient at the target space. Consider pairs of learning points, X and Y in the original space. The diffusion map places X and Y close to each other in the target space if there are many different ways to "jump short distances" from one learning data point to the other in order to get from X to Y or vice versa. In this way, the diffusion map cluster together in the target space full and non-linear manifolds of learning data from the origin space.

After the diffusion map step is performed, its output is a mapping from the origin space to the target space where all points in the learning data which reside on the same manifold map to the same cluster. This raises two issues. First, in order to use this mapping to identify outliers, we want to map newly arriving testing data points. Because of the dimensionality reduction, however, those testing data points may be mapped to the same clusters as the original learning data manifolds, even if they are outliers which do not reside on the manifolds. Second, the diffusion map itself is a fairly large model with a representation including all learning data points in their origin high-dimensional representation. Performing the mapping itself for the testing data points is also highly consuming in CPU cycles and memory space. Thus, it is a bad fit for use by the often low-resource Protects.

Previous research efforts suggest several solutions to the above two problems. However, all of them suffer one limitation or the other. Diffusion Nets provide a much better solution, as follows. After the diffusion map is constructed at the high-resources tier (i.e., C3), it is learned by a neural net. The neural net generalizes on the learning data and provides a mapping from origin space to target space using relatively low CPU and low memory. In addition, the high-resource tier may also learn the reverse mapping, and construct an autoencoder which maps a point in origin space to target space and back to origin space. Now consider a newly arriving testing data point X. If the autoencoder maps X to a point m(X) in one of the learning data clusters (target space), and then the reverse transformation maps it to X' (origin space) which is far from X, then X is an outlier testing data point, residing out of the learning data manifolds. Furthermore, the farther the distance of X' to X the higher the abnormality in X. In this way, Diffusion Nets solves both issues of Diffusion Maps in a way which makes it easy to implement on our asymmetric two-tier architecture.

Because the second phase in generating the diffusion nets uses neural network and autoencoder constructions, compression algorithms for minimizing network size can now be employed, as described above. This third step can be added at the end of the diffusion net algorithm. Its input will be the autoencoder and neural network which are the output of the second step of the diffusion net. Its output provides the compressed neural network and compressed autoencoder to be used by the Protect for identifying outliers, as described above.

Another example algorithm that can be used for model generation is the Gaussian Mixture Model (GMM). A relatively simple way of modeling the normal learning data is to assume that it is of Gaussian distribution, or of several Gaussian distributions. In this case it is only natural to attempt to generalize, or cover, the learning data set using several Gaussians. The method is well known and is called GMM. The set of Gaussians is then the model that is used by the Protect, so that the farther a given testing data point appears from this set—the higher its abnormality label.

Another example algorithm that can be used for model generation is K-means clustering, which is a very popular method of clustering. K-means clustering operates by choosing a set of K gravity centers, and the level of abnormality can be inferred from the distance of a testing data point to these centers, as compared to the average distance of the learning data to these centers.

Another example algorithm that can be used for model generation is Principle Component Analysis (PCA), which is a linear method of dimensionality reduction, where a set of congruent principle components is evaluated as the subspace containing most of the meaningful data. When the dimensionality is thus reduced it is sometimes much easier to learn the data effectively. PCA may be a first step followed by a clustering step, e.g., GMM. Then, proceed as in GMM above in order to detect outliers.

Another example algorithm that can be used for model generation is a Classification algorithm. Just like clustering, classification is a functionality implemented by a plethora of algorithms. For example, the well-known Linear Discriminant Analysis (LDA), or the more general non-linear Support Vector Machine (SVM), both learn a subspace which differentiates between two (or more) classes. Once the subspace is learned, the model usually consists of a vector which is small enough to use at the Protect. Evaluating the class of a testing data point is relatively simple and easy, commonly consisting of a single vector multiplication operation.

To assist with model generation for classification, Attack injection can be utilized. Classifier construction requires a label associated with each of the instances in the learning data set. It is common to have two (or more) types of labels. For example, one label may be "normal" and the other one may be "attack". For example, suppose our learning set contains data recorded during normal operation, together with data recorded (and labeled accordingly) during an attack (or several attacks). The latter type of data can only be obtained during an attack. However, once we detect an attack in a production, sensitive system we will stop it immediately, and so the recording will not be complete. Thus, in order to obtain "attack" labeled example data points, we use a method called attack injection, in which known attacks are simulated, and the simulation is recorded. The attack can be implemented using fake malicious devices and the system can be used to record the wireless activity. The result is a testing data point which is labeled "attack" and may serve as a learning data point for the classifier construction process at C3. The attack transmission pattern, once recorded, can become an example of attacks that should be detected by the system.

In order for the learning algorithm to generalize from the examples collected during attack injection, embodiments may implement and repeat the attack pattern using various variants and noise. The noise can potentially be incurred at every parameter or characteristic or data of the basic attack pattern. For instance, the timing of the different transmissions in the communication protocol may change a bit, depending on a random generator; the placement of the devices in space may change (which may affect the signal strength as received by the attacked device and recording Protect), and the attacking device may even move between locations; the type bits or other irrelevant bits in the packet headers sent by the attacker may vary; the amount of control and management packets may change; the protocol may change (e.g., a man-in-the-middle attack may use Bluetooth or Bluetooth LE or Wi-Fi); type of attacking device may change; and so on and so forth. The learning data set will thus contain many variants (although there are typically too many variants to cover them all). Embodiments use the learning (e.g., classification) to generalize the generated attack model in order to detect other attacks from the same family in the testing data points, attacks that we did not necessarily inject explicitly in the learning data. The classification learning algorithm will learn the best way to differentiate between attacks of the injected type and normal activity. Furthermore, most algorithms will produce a model which will be able to report how likely a testing data point belongs to the attack pattern, which is the certainty in which the classification attributes that point to the "attack" class.

Device Profiling

The operations for learning the routine transmission patterns in a Protect's environment, as described above, can be deemed "Protect Environment Profiling", or, simply "environment profiling." An alternative method, called "Device Profiling", learns the normal behavior and transmission patterns of a particular device. This approach is not exclusive to environment profiling, as they can exist and be used together in the same monitoring system. In device profiling, every device that is detected by any Protect can be modeled at C3 (routine and normal behavior) using the learning data. Learning data can be collected for that device over time and by several different Protects for which the device appear in their environments. Once a model is built at C3 for that device normal behavior, every Protect for which the device appears in its environment uses its collected testing data to evaluate the device transmissions for deviations from the model.

A benefit in device profiling (as opposed to environment profiling) is that it is easier to implement, utilizes simpler data of less dimensions, and has easier to understand patterns. Furthermore, behavioral data for a device can be collected in different locations by different Protects. Device modeling may also use enrichment data arriving from external sources. For example, suppose the device is known to be a running shoe manufactured by a particular company. Then, technical specifications by that company for the shoe can provide valuable information—e.g., is it Bluetooth? Is it battery operated? What is the data it collects? Who receives the data from the shoe? When? Etc. Similarly, the shoe profile may be enriched using data collected in the system on the behavior of other shoes of the same type (e.g., do they tend to connect to phones or cars? What volume of transmission is expected? When?)

For all of the above reasons, device profiling is typically easier and faster to learn and thus often more effective than environment profiling. However, a malicious pattern that can only be identified by observing two or more devices will not be detected. For instance, a distributed denial of service attack (DDoS), launched by hundreds to hundreds of thousands of devices, each of them deviating just a little bit from its routine behavior, is easy to detect using the holistic, environment learning, but is hard to detect using device profiling. Once again, fortunately, both approaches are independent, and can be implemented in the same system, complementing each other in observing abnormal behavior.

In order to processes on the fly collected testing data against a device profile, the device profile is to be available locally to the Protect. To this end, once a device is seen in a Protect environment, the Protect can acquire the up-to-date model for that device from C3. Alternatively, or, additionally, C3 may pre-push a freshly-modified profile of a device to the Protects which are known to regularly see the device in their environments.

Triangulation.

While device characteristics may be collected from external sources (as described above), device transmission behavior does not require a separate data collection mechanism: it can use almost the same collection mechanism as employed by the Protect for testing environment abnormal behavior. One exception is the manipulation required on received transmissions to calculate the device location. This procedure takes as its input the data received by several Protects and employs a method known as triangulation in order to calculate the approximate device location. Notice that triangulation assumes that the location of the receiving Protects is known. This is a reasonable assumption as the location of every (static, office-located) Protect may be determined and fixed when it is installed. More specifically, consider the example of Bluetooth and Wi-Fi protocols. When receiving a transmission using these protocols, in every packet the receiving hardware usually provides the strength of the received signal, commonly called Received signal strength indication (RSSI). Using the RSSI signal strength, the distance of the transmitting device to the receiving Protect can be estimated. Such estimation is prone to noise and distractions, especially in a built environment where other transmissions may mask the reception and where walls of various materials and dimensions may block the signal or cause it to move in multipath routes. Thus, triangulation using RSSI in a built environment often incurs significant digression from the actual location. It is important to note that triangulation, involving data from several Protects, is performed at C3 (although initial estimation of distance from Protect can be computed locally by each receiving Protect using RSSI). To perform triangulation, it is common to use the data from three different Protects at three different locations, all of them receiving the same signal. However, it is also known that triangulation accuracy can be improved significantly the more Protects receive the signal.

Location Pre-Mapping.

An additional process that can be used for estimating device location is a mapping done on the received signal. Here, after installing the Protects in a location (e.g., an office), we can move between the rooms in the office with a transmitting device. The device location S is known at every point in time, and the Protects receiving the transmission continuously record the signal strength. Thus, for every location S of the office, the collection of Protects and received signal strengths for a device transmitting from S can be gathered, represented as: {(p1,s1), (p2,s2), . . . }. Once this mapping is obtained for all locations S in the office, and assuming it is stored at C3, the inverse query can be answered: "given a transmission received with a specific configuration of signal strengths received at the set of protects, what is the location of the transmitting device?" Answering this query now involves a simple search in the mapping, finding the closest entry in the mapping to the configuration of received signal strengths. Of course, here too, various interruptions may intervene with this process, deteriorating the accuracy of received signals at the Protects. Furthermore, the mapping is obtained using a specific device of specific hardware. It may have resulted in a different mapping for different transmitting devices. Nevertheless, with enough Protects installed, at the required accuracy of finding the room where the device resides, or otherwise requiring only approximate location, this method may prove to be highly efficient. It may be employed together with the triangulation method for improved efficiency.

Example Data for Device Profiling and Related Anomalies.

We now provide an example of a set of features, together with examples for respective anomaly testing questions, which can make a profile of a specific device. In this example, the profile includes at least three parts: static features that are not expected to change, a collection of recent interactions with other devices/networks/mates, and routines extracted from the list of recent interactions. In this example, we define that a "device" has a one-to-one relation to a MAC address, excluding those temporary random, empty MAC addresses sometimes used in probe-request messages.

1. Static features—These static features are anomalous only if they unexpectedly appear to change for a given MAC address. For simple anomalies, we will assume that the "static" features do not change.
   a. Protocol (Bluetooth, Wi-Fi, Bluetooth LE, 3G, 4G, etc.)—the protocol is always known as different hardware may be used to receive transmissions in different protocols
   b. Manufacturer—the manufacturer is not always known. Sometimes, for instance in the case of Apple™ iPhones™, the manufacturer allocates a certain range of MAC addresses to a line product, and thus the manufacturer can be inferred by the MAC addresses. Another way of inferring relation to a manufacturer or even a device is when the MAC addresses have some relation, e.g., Wi-Fi and Bluetooth MAC addresses on the same Apple iPhone appear to be consecutive.
   c. Type—examples: which iPhone is it? It is Samsung™ Gear X virtual reality glasses? It is a Nike™ Shoe? It is a bracelet?
   d. Which networks device has seen/advertises—this is a list of access points and networks that the device has connected to, especially for Wi-Fi. Phones sometimes publish those networks when they send probe-request messages, trying to connect to a known network. Thus it is relatively easy to get the list of networks the phone has seen or has been connected to.
   e. Finger printing, signatures, fields from the packets, applications installed—Sometimes devices would fix specific bits in the packets they send. This is called signature extraction in the literature. To match a signature to a device embodiments use known devices and train a classifier on set of bits that are fixed in the packets they send. Embodiments can also use unsupervised methods (e.g., frequent itemset mining) to extract signatures that were not previously met from a newly encountered packet stream. Then, when the same collection of bits—the signature—appears in received packets, the device type or sometimes even the specific device can be inferred. There are results in the literature showing how to find the collection of applications installed on a device, say, a phone, using inspection methods looking at its communication pattern and bit stream, sometimes even when the communication is encrypted.
   f. Sensitive locations where this device has never visited—an office can have a number of locations which are extremely sensitive. For example, the CEO office, or the server room. This field indicates the device is mobile and is not allowed (or, has never visited) a certain sensitive location.
      i. Anomaly detection question—an obvious anomaly question for the Protect (or C3, in case that only C3 can compute location) to monitor—is the device visiting a sensitive and/or forbidden location?
   g. Sensitive mates with which this device is not likely to connect/talk—same as above, however for networks or people with which this device has not connected or is not allowed to connect
      i. Anomaly detection question—is the device connecting to or talking with any of them
   h. Is mobile?—There are levels of mobility. For example, a laptop is mobile, but less mobile than a cell phone. A simple implementation would fix this as a binary field, e.g., a Protect is non-mobile, while a laptop is mobile. However, a phone and a bracelet are generally more mobile than a laptop, so this field may indicate levels of mobility. Furthermore, different wearable devices would be wear by more mobile people. In general, inferring the level of mobility requires analysis of data from different protects as the device appears to be moving when detected in different locations in different times. However, even a single Protect can provide valuable information on the intensity of visits and departures by the device from that protect environment.
      i. Anomaly detection question—is a static device moving? Is an erratically moving device suddenly became stable? In general—has the device changed its moving intensity?
   i. Associated other devices—here we refer to clusters of devices that appear to move together, or that belong to the same person. A matching or a correlating algorithm can be used to pair together sister devices, e.g., they appear in the office (and in general to a Protect) at the same times.
      i. Anomaly testing question—sister devices do not appear to move together anymore?
2. Conversations or 1-1 interactions over a period (e.g., Y*30 secs, Y=4) for the last X (e.g., X=3) months. Each can contain:
   a. Mate—a partner with whom the device spoke during the period, or a network with whom it interacted
   b. Time—for how long
   c. Location—Approximate location of device (computed using triangulation or office pre-mapping)
   d. Bytes out—how many bytes sent
   e. Bytes in—how many bytes received
   f. Packets out—how many packets transmitted
   g. Packets in—how many packets received
   h. Control messages out
   i. Control messages in
   j. Management messages out
   k. Management messages in l. Encryption and encryption method if available m. Deep Packet Inspection (DPI) analysis if available n. Other signatures that we were able to extract for the conversation—e.g., phone state, whether the screen was open during interaction, etc.

3. Routines per every hour (e.g., between 10-11 am) compiled from the list 2a-2n above. For this purpose, a "travel routine" can be a list of places usually visited by device and when, a "communication routine" can be a list of communications with whom and when. A "Day routine" can be per hour, and a "Week routine" per day). Anomalies can be computed on the fly from the arriving data by comparing to the routines as outlined below.

a. Workday travel routine
      i. Anomaly testing question—on a certain hour the device did not visit usual places
   b. Workday communication routine
      i. Anomaly testing question—on a certain hour the device did not communicate with usual mates
      ii. Anomaly testing question—statistics look different in certain features
   c. Holiday travel routine
      i. Anomaly testing question—on a certain hour the device did not visit the usual places?
   d. Holiday communication routine
      i. Anomaly testing question—on a certain hour the device did not communicate with usual mates?
   e. Weekly travel routine
      i. Anomaly testing question—on a certain day the device did not visit usual places?
   f. Weekly communication routine
      i. Anomaly testing question—on a certain day the device did not communicate with usual mates?
   g. Outlier events—those abnormal events that were checked and found false alarms How to Compute Routines.

In order to compute routines we consider a list of 1-1 conversations, as in item (2) in the sample profile above. The conversations have an estimated location (computed using triangulation and office mapping, as described above in this document) and a timestamp in which the conversation took place (or a duration of Y*30 sec or so, as in the description of item (2) above, during which the conversation took place). Computing a routine can be done using many different methods. We now show how to do it using a machine learning method called a decision tree, although again many other methods abound that can be discerned by those of ordinary skill in the art. For example, it is customary to improve on the decision tree using its more robust form called random forest.

In order to use a decision tree, it is first to be trained using conversation data. A decision tree is a supervised method whose training require a label for each data item. Once the tree has been trained, a new data item which does not have a label can be used as an input to the tree to get a label as the output. Thus, using the tree is done as follows. Suppose we are interested in a travel routine (other routines, such as communication routine, can be computed in a similar manner). Then, the decision tree is trained using the conversations timestamp data, where the location is given as a label. No other data from the conversation is given, except for the time of day, the day in week, whether it is a workday, etc. Meaningful locations will thus be "office" or "home" or "north wing" or "7th floor cafeteria". However, locations may also be given using Protect locations, namely, "Protect 17" indicates the device spent its time near Protect 17.

Once the tree has been trained using timestamp data it essentially encodes a routine. Given a timestamp, the tree will now output a location, which it predicts by using all the training data it was given. For instance, if during a workday at about noon the device was detected at the 7th floor cafeteria, then this will be its prediction given a timestamp which is noon on a workday. If at noon on workdays the device was found 70% of the time (70% of the training conversations) in the 7th floor cafeteria and 30% of the time in the top-floor restaurant then respective predictions are going to be given by the tree with respective certainty.

C3 Restrictions in Filter Construction

The task of constructing filters is given to C3. To this end, C3 may be required to solve a high-complexity optimization task in order to provide activation rules and filters to all Protects. There may even be additional considerations that relate to C3 restrictions, as follows.

Updating Filters. In some embodiments, the filters for every Protect (or subsets of Protects) are updated every few days in order to keep the logic up to date with the latest security indicators and research findings.

Complexity of Filter Construction. There can be many Protects for every enterprise and organization. Constructing the models and compiling the filters thus cannot be a highly complex process, as it is to be finished within a reasonable time, and the C3 infrastructure should be kept to a reasonable cost.

Latency of Alarm Generation. The process of producing alarms from incoming data at C3 cannot be of very high complexity and/or latency, because it is important to perform alarm generation in real time. For example, in the case of a local alarm, it makes sense to query other Protects to verify that the alarm is not a false positive. Querying all Protects, or even a large fraction of them, or even doing so sequentially while blocking on replies, all may prove to be too late in the case of a true positive.

Complexity of Model Generation. The data arriving from the Protects is used to produce the behavioral models, predictive models, and decision rules, using sophisticated learning processes as described above. The optimization process, which involves high-complexity analysis of large quantities of data, may thus be re-executed every day or so. Hence it cannot be of complexity that will require expensive resources at C3, or will require too long a time to solve.

Interaction of C3 and the Protects

In some embodiments, C3 interacts with the Protects and collects data from them in at least three modes: (1) urgent connections for real-time monitoring, false alarm elimination, and alarm generation; (2) pushing new filters and new rules for filter configuration from C3 to the Protects; and (3) bulk transfer of collected data for analytic processes and research.

Urgent messages carrying potential evidence of threats are handled immediately and with very high priority. Urgent messages are usually sent when a known "signature" for malicious behavior is identified by the Protect by observing wireless interaction, for example when a certain type of wearable device that is known to be malicious begins communicating with the local organization Wi-Fi. In this case the Protects use any available communication channel, even a very low bandwidth connection. The volume of such messages is small, including only the necessary evidence of a potential breach, attack or malicious activity. C3 will use previously collected data and previously computed indices, as well as previously generated knowledge (such as mathematical data models) to assess, validate, and correlate the new evidence/threat and trigger an alarm, if needed. Thus, the handling and evaluation of real-time data, as well as decision making, are fast and immediate. If needed, C3 may also consult other Protects (typically a small number of them that happen to co-locate with the Protect that initiated the activity) and ask them for help in refuting or verifying the potential threat (by providing further evidence of the malicious behavior's "signature," or evidence to the contrary). Such a consultation, however, will involve a small number of communication rounds, each of which consists of queries by C3, and some limited messaging by the corresponding Protects. If the decision is to raise an alarm, then this can be done by C3, by the Protect itself, by other Protects, or by any subset of them (in particular, when the subset members overlap in covering the same geographic area).

For example, assume that an employee at the office wears a "smart" bracelet which communicates with his phone once a day, say, to collect health-related data. If that employee is changing offices, this type of communication might appear suspicious to a Protect which has not previously seen it. In such a case, one of the actions by C3 false-positive elimination module is to query the models it created for nearby Protects. C3 will discover the Protects which are familiar with this behavior of the bracelet. It will go ahead and query them, just to make sure that the bracelet has moved locations and was not seen by them.

As another example, suppose a Protect reports on some suspicious transmission activity. In order to get an approximated location using triangulation, C3 may query nearby Protects for their estimation of signal strength in this transmission. Another example concerns erratic transmissions by a Protect which may trigger an inquiry of nearby Protects by C3 to check whether the erratically-transmitting Protect is faulty.

Some offline or online processing in C3, including, for example, data mining and machine learning using incoming data, research activity, and/or external knowledge acquisition, may result in new filters and rules that C3 sends to the Protects for immediate deployment and activation. While such communication is not as urgent as that used to generate alarms, it is somewhat urgent as it may include newly mined/acquired indications and patterns of malicious activity which are to be immediately integrated in the rules for identifying signatures, just in case the attack is launched again in more locations. The transmitted messages typically do not include large amounts of data, and hence, in some embodiments C3 may decide to perform this type of communication at arbitrary times and as frequently as several times a day, as it sees fit and depending on factors such as the severity of the malicious activity and the availability of a connection channel to the Protects.

Bulk transfers move data collected and stored on the Protects to C3 for deep analytics and knowledge extraction, which can include transmissions, certain data fields, statistics, fragments of transmissions, or other data received and collected and stored by the Protect since the last bulk transfer, and tagged by the appropriate Protect filter as potentially valuable for generation of knowledge (including, for example, models of transmitted data, normal/abnormal behavior, profiling, or features indicative of attacks). Bulk transfers can carry relatively large volumes of data. They will thus be scheduled in collaboration of C3 with the corresponding Protect, taking into account the load on C3, availability of high bandwidth communication channels, availability of a power source for the corresponding Protect, storage restrictions at the Protect, and other factors.

Threat Severity and Evaluation of Data

In order to decide on a course of action, indications for malicious activity are classified by Protects according to their severity. It may be the case that this severity will be implied by the specific threat behavior which is detected through its signature. In this case, the severity will be manually determined when the signature is specified by the researcher who discovered it. However, the severity may also be derived from the deviation of the suspicious event from normal behavior. In this case, the severity is automatically determined by the anomaly detection module.

Below is a list of threat indication events, their severity (which may also be referred to as a "threat level"), and the requisite response. These examples, however, may be further refined (even dynamically on-the-fly during system operation) into many more threat levels as needed.

Communication with a blacklisted Uniform Resource Locator (URL), Internet Protocol (IP) address, or a device, is to be immediately reported. This is a common, well-known sort of threat protection.

The most urgent and definite indication of malicious activity is a behavior that precisely matches a pattern known to be a signature of an attack. For example, the pattern may indicate that a malicious device is perpetrating a "man in the middle" attack against enterprise devices. When a Protect sees this type of activity, it can immediately report to C3, using any available communication channel. If C2 is available, then it can provide a reliable relay channel to C3. However, if direct communication with C3 is currently temporarily unavailable, the Protect should be able to use "local" means to announce the threat (such as a direct Bluetooth or Wi-Fi connection to a dedicated cell phone, or sound-alarm-generating device).

A relatively strong indication of a potential attack is when an as yet unknown device begins interaction with a local device. The severity of the potential attack is evaluated according to the centrality of the local device: it may have access to sensitive data, it may be involved in the control of a critical system, it may be able to communicate with other devices that have access to sensitive data or critical systems, and so forth. While this type of indication is strong enough for the Protect to generate a local alarm, the severity is also dependent on the sensitivity/criticality of the environment. Thus, in addition to the general rules deployed at the Protect by C3, the response in this case may also be tuned by the carrier of the Protect or by the respective system administrator. In any case, the response can generally involve propagation of the event information to C3 at the earliest possible time, as C3 may have additional data which may help eliminate a false alarm, as described below.

The detection of an as yet unknown device by a Protect is another high-interest event, regarding which information should be moved to C3 at the earliest possible time, since C3 may have data gathered from other Protects that could help evaluate the threat level. The type and manufacturer of the new device, the time and place it was purchased, its behavior until now, its ownership, etc., should be taken into account when evaluating a potential threat.

Appearance of an already known device at a new location is also of high interest. This case may be more relevant to stationary Protects. Once the information is communicated to C3, C3 may consult additional sources of information (see the false alarm elimination section below) to determine whether identity theft has occurred. For example, if the same device is seen at two or more distant locations (a case detectable by C3 only) in a very short time, an alarm should definitely be generated.

Transmission of a relatively high amount of data by a device may be of interest, especially when the device usually does not transmit large chunks of data. Data collected at one place may be transmitted when the device reaches a location where it has enough resources, or at places or times it was programmed to assume the absence of security or monitoring facilities. In general, data leakage is a potential threat that must be monitored closely—the mobility of battery-operated devices enables network-free data movement, and thus this threat may be transparent to traditional monitoring solutions.

The patterns of interaction by local devices and local networks as recorded by a Protect are also of interest to C3. This is especially true when activity slightly deviates from the mathematical model and is not considered normal activity, although the deviation does not provide high confidence in deeming it suspicious. However, this type of data, which is collected over time, need not be immediately moved to C3, as it does not typically indicate a threat. This type of data is mainly used by C3 offline in order to learn patterns and create rules for alarms and data propagation. Thus, this data, which may be very big (might reach gigabytes (GB) per day), may be communicated to C3 when the device is connected to an electricity source and a high-bandwidth Internet channel is available to the Protect. Yet, it is important to note that this data still consists of important metadata and digests. Sending C3 all the raw data seen by a Protect including all bits seen (even excluding the payload) is too large for the Protects to send and for C3 to process and store. If at all possible, it will make the system cumbersome and expensive.

Avoiding False Positive Alarms

A threat indication received by C3 from a Protect includes the local view of a single Protect and includes the restricted information available to that Protect at that time. Once such an indication is received, C3 has two conflicting goals: to propagate an alarm whenever it seems necessary while avoiding false positives as much as possible. If the threat looks real (is thought to be a "true positive"), an alarm is to be propagated as soon as possible ("in real time"), but if too many false positive alarms are propagated by C3, this will result in successive alarms being very quickly ignored, rendering them useless.

Thus, when C3 receives indication of a threat from one of the Protects, in some embodiments it triggers a process whose goal is to verify or refute that threat. In general, C3 may enrich the data available to consider incoming threat indications, and may consult with several additional sources of information, including:

Domain knowledge, gathered from external sources, such as the reports of cyber security companies (e.g., such reports may enlist signatures for known attacks, attack types, or dangerous behavior).

The recorded past history, type, behavior, and in general, the profile (as described above) of the potentially malicious device, and everything known about it or about similar device types (e.g., watches) and about devices from the same manufacturer, version, series.

Other Protects in the vicinity of the suspicious device, as described above.

The level of threat sensitivity as configured by the system operator (threat sensitivity may depend on several factors, including, for example, the distance to sensitive data and recent malware activity)

The reputation of the reporting Protect—e.g., is the Protect likely broken? Breached? Up to date?

Given all the sources of additional information, C3 can compute the confidence for the received evidence to indicate a true threat, and the urgency of threat notification.

C3 may then decide on the necessary course of action. If the threat seems real, but notification is not urgent (e.g., as in the case of an attack which is still in its preliminary intelligence gathering activity, or reconnaissance stage), C3 may also decide to collect further evidence—e.g., by contacting other Protects or searching its storage, as described previously in this document, prior to generating an alarm.

C3 Implementation

C3 can be realized in many different ways. The hardware can be a single server end station, a cluster of servers, a multiprocessor, a computer with many nodes (sometimes called a mainframe or supercomputer), or even virtual machines in a cloud service. Fault tolerance (for ensuring both data persistence and durability of C3 monitoring activities) can be provided using multiple replicas and failover algorithms (such as the well-known Paxos algorithm for leader election and follow-up modifications for stateful replication) when implementing C3 on a distributed system, or a multi-computer machine, or using cloud failover services when using a public cloud. A variety of the standard server-edition offerings can be used as an operating system, including, for example, Linux and Windows. If using an Infrastructure-as-a-Service-type cloud (such as Amazon's™ EC2™) or Software-as-a-Service-type cloud (such as Microsoft™ Azure™) and working with virtual machines, then any of the standard guest operating systems can support C3, provided it is installed with the appropriate runtime libraries and software stacks. C3 can be implemented using nearly any mature programming language or combination thereof, such as C, C++, C#, Java, etc. Standard runtime libraries of these programming languages also provide popular connectivity interfaces, which may include Application Programming Interfaces (APIs) for message passing, Internet/HTTPs connections, and remote procedure calls (RPC). When scaling up by multithreading or multiprocessing on the same physical or virtual machine, C3 may use shared memory mechanisms and interfaces to shared data in addition to the abovementioned message-passing interfaces. When scaling out by replication across different machines, C3 may (but not necessarily) use Remote Procedure Calls (RPC). Connecting to Protects can (but not necessarily) be performed over encrypted channels, for instance using HTTPs and Secure Sockets Layer (SSL)/Transport Layer Security (TLS). In the application layer, C3 may use popular platforms for performing analytics and data mining. An example of such a platform is R and related packages.

Protect Implementation

Figure 6:
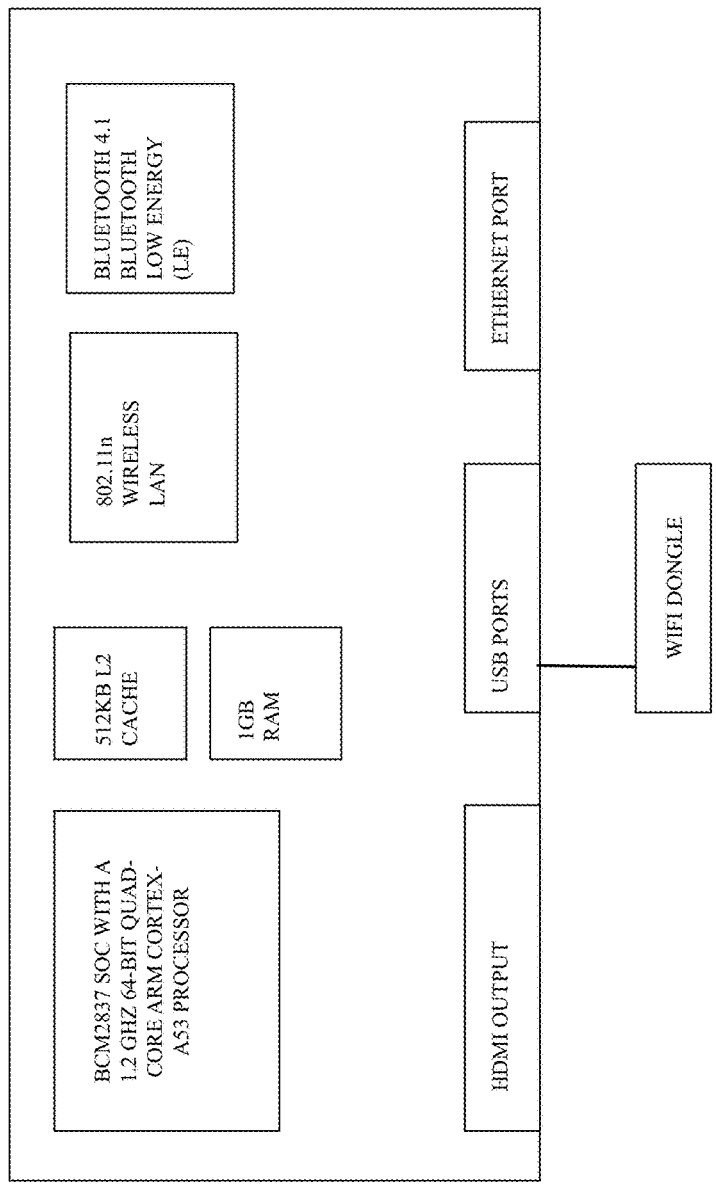
FIG. 6 is a block diagram illustrating one possible hardware configuration for a Protect according to some embodiments.

FIG. 6 is a block diagram illustrating one possible hardware configuration 600 for a Protect (i.e., Protect) according to some embodiments. This depicted hardware configuration 600 is similar to that of a Raspberry Pi 3, and includes a System on a Chip with a 1.2 GHz 64-bit quad-core ARM Cortex-A53 processor, a 512 kilobyte (KB) L2 cache, 1 GB of RAM, an 802.11n wireless network interface, a Bluetooth 4.1/Bluetooth LE interface, a High-Definition Multimedia Interface (HDMI) output, Universal Serial Bus (USB) ports (here coupled with an external Wi-Fi network interface "dongle," and an Ethernet port. However, as described throughout this specification, there can be a huge number of different types and capabilities of Protects, and thus, this example is just that—one example of many possibilities. For example, some Protects may be battery powered, while others are powered by wired power. As another example, some Protects may have more or less storage, more or less processing power, more or less memory, more or fewer communication/network interfaces, etc.

C2 Implementation

Similar to both C3 and the Protects, C2 can be realized in many different ways. For example, C3 can be implemented as a software module (e.g., an application or collection of applications, a virtual machine, a container, etc.) using hardware ranging from a low-powered computing device (e.g., a Raspberry Pi), a client end station such as a PC or mobile device, a server end station, a multiprocessor, etc. Further detail describing additional possible ways to implement C2, C3, and Protects will be presented later herein with regard to FIG. 9.

Exemplary Flows

Figure 7:
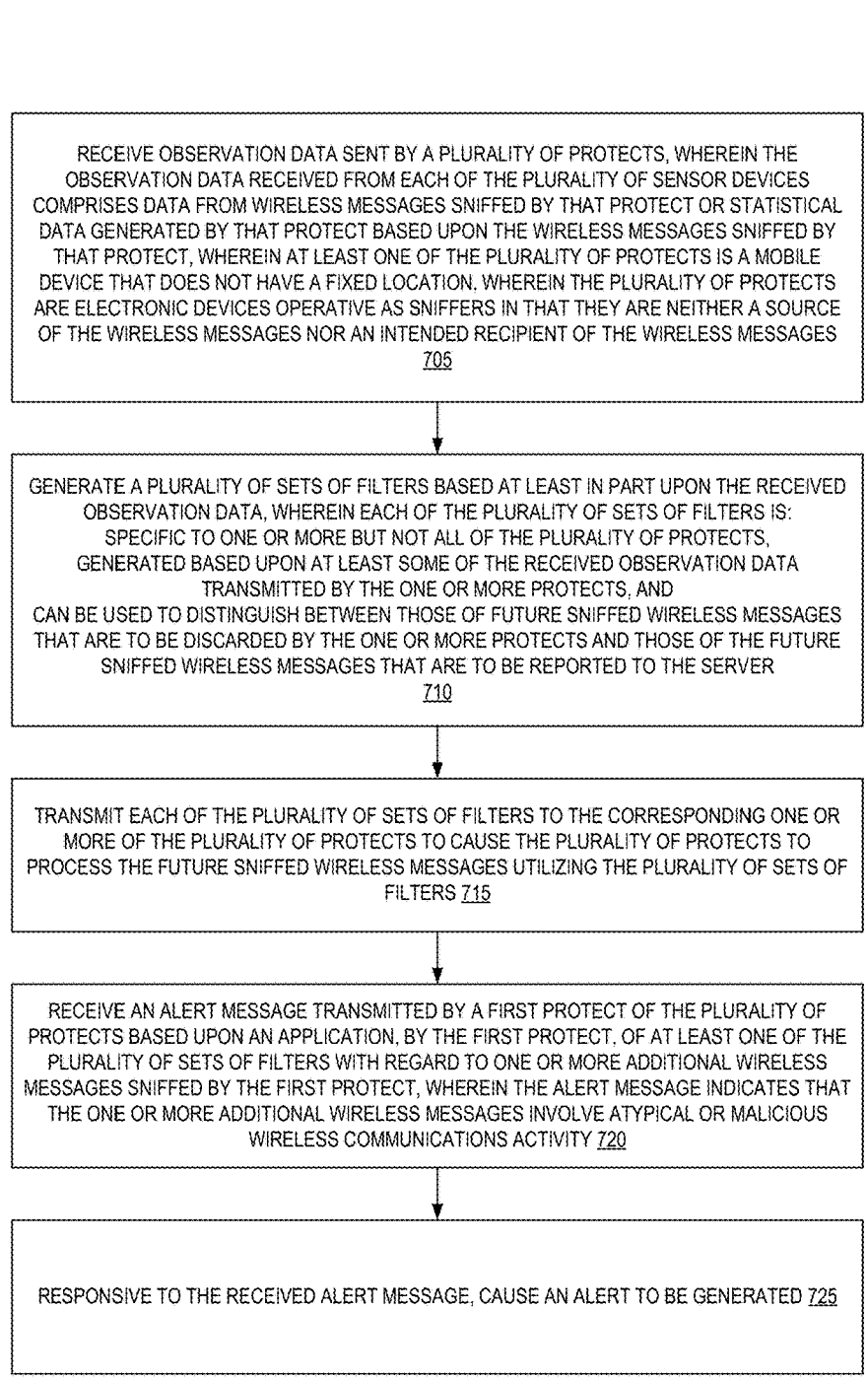
FIG. 7 is a flow diagram illustrating an exemplary flow for detecting atypical or malicious wireless communications activity according to some embodiments.

FIG. 7 is a flow diagram illustrating an exemplary flow 700 for detecting atypical or malicious wireless communications activity according to some embodiments. In some embodiments, these operations can be performed by the C3 104 of the other figures.

The operations in this and other flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

At block 705, the flow 700 includes receiving observation data sent by a plurality of Protects. The observation data received from each of the plurality of Protects comprises data from wireless messages sniffed by that Protect or statistical data generated by that Protect based upon the wireless messages sniffed by that Protect. At least one of the plurality of Protects is a mobile device that does not have a fixed location. The plurality of Protects are electronic devices operable as sniffers in that they are neither a source of the wireless messages nor an intended recipient of the wireless messages.

At block 710, the flow 700 includes generating a plurality of sets of filters based at least in part upon the received observation data. Each of the plurality of sets of filters is specific to one or more but not all of the plurality of Protects, generated based upon at least some of the received observation data transmitted by the one or more Protects, and can be used to distinguish between those of future sniffed wireless messages that are to be discarded by the one or more Protects and those of the future sniffed wireless messages that are to be reported to the server.

At block 715, the flow 700 includes transmitting each of the plurality of sets of filters to the corresponding one or more of the plurality of Protects to cause the plurality of Protects to process the future sniffed wireless messages utilizing the plurality of sets of filters.

At block 720, the flow 700 includes receiving an alert message transmitted by a first Protect of the plurality of Protects based upon an application, by the first Protect, of at least one of the plurality of sets of filters with regard to one or more additional wireless messages sniffed by the first Protect. The alert message indicates that the one or more additional wireless messages involve atypical or malicious wireless communications activity.

At block 725, the flow 700 includes, responsive to the received alert message, causing an alert to be generated.

Figure 8:
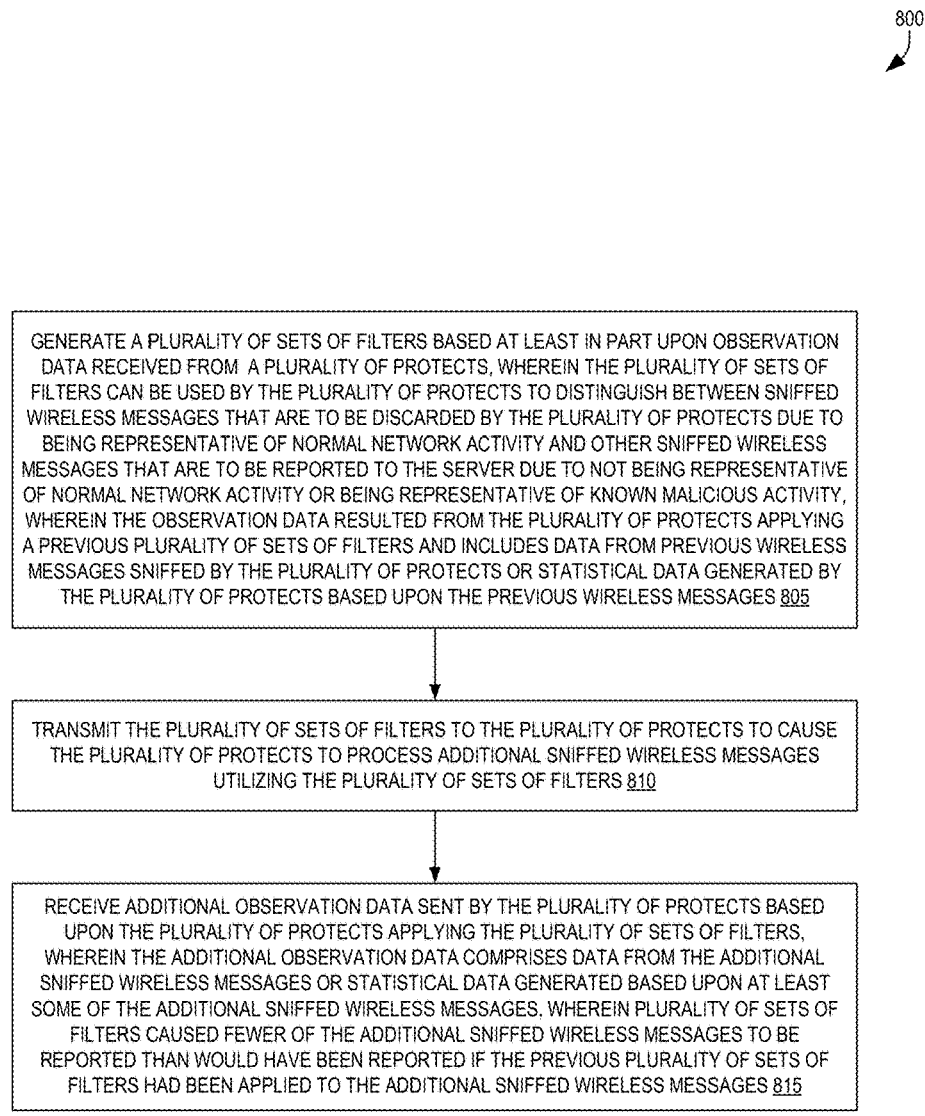
FIG. 8 is a flow diagram illustrating an exemplary flow for enabling atypical or malicious wireless communications activity to be efficiently detected via a plurality of Protects according to some embodiments.

FIG. 8 is a flow diagram illustrating an exemplary flow 800 for enabling atypical or malicious wireless communications activity to be efficiently detected via a plurality of Protects according to some embodiments. In some embodiments, these operations can be performed by the C3 104 of the other figures.

At block 805, the flow 800 includes generating a plurality of sets of filters based at least in part upon observation data received from the plurality of Protects. The plurality of sets of filters can be used by the plurality of Protects to distinguish between sniffed wireless messages that are to be discarded by the plurality of Protects due to being representative of normal network activity and other sniffed wireless messages that are to be reported to the server due to not being representative of normal network activity or being representative of known malicious activity. The observation data resulted from the plurality of Protects applying a previous plurality of sets of filters and includes data from previous wireless messages sniffed by the plurality of Protects or statistical data generated by the plurality of Protects based upon the previous wireless messages.

At block 805, the flow 800 includes transmitting the plurality of sets of filters to the plurality of Protects to cause the plurality of Protects to process additional sniffed wireless messages utilizing the plurality of sets of filters.

At block 805, the flow 800 includes receiving additional observation data sent by the plurality of Protects based upon the plurality of Protects applying the plurality of sets of filters. The additional observation data comprises data from the additional sniffed wireless messages or statistical data generated based upon at least some of the additional sniffed wireless messages. The plurality of sets of filters caused fewer of the additional sniffed wireless messages to be reported than would have been reported if the previous plurality of sets of filters had been applied to the additional sniffed wireless messages.

Exemplary Electronic Devices

As described herein, one or more parts of an embodiment may be implemented using different combinations of software, firmware, and/or hardware. An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set of one or more physical network interface(s) to establish network connections (to transmit and/or receive code and/or data using propagating signals) with other electronic devices.

Figure 9:
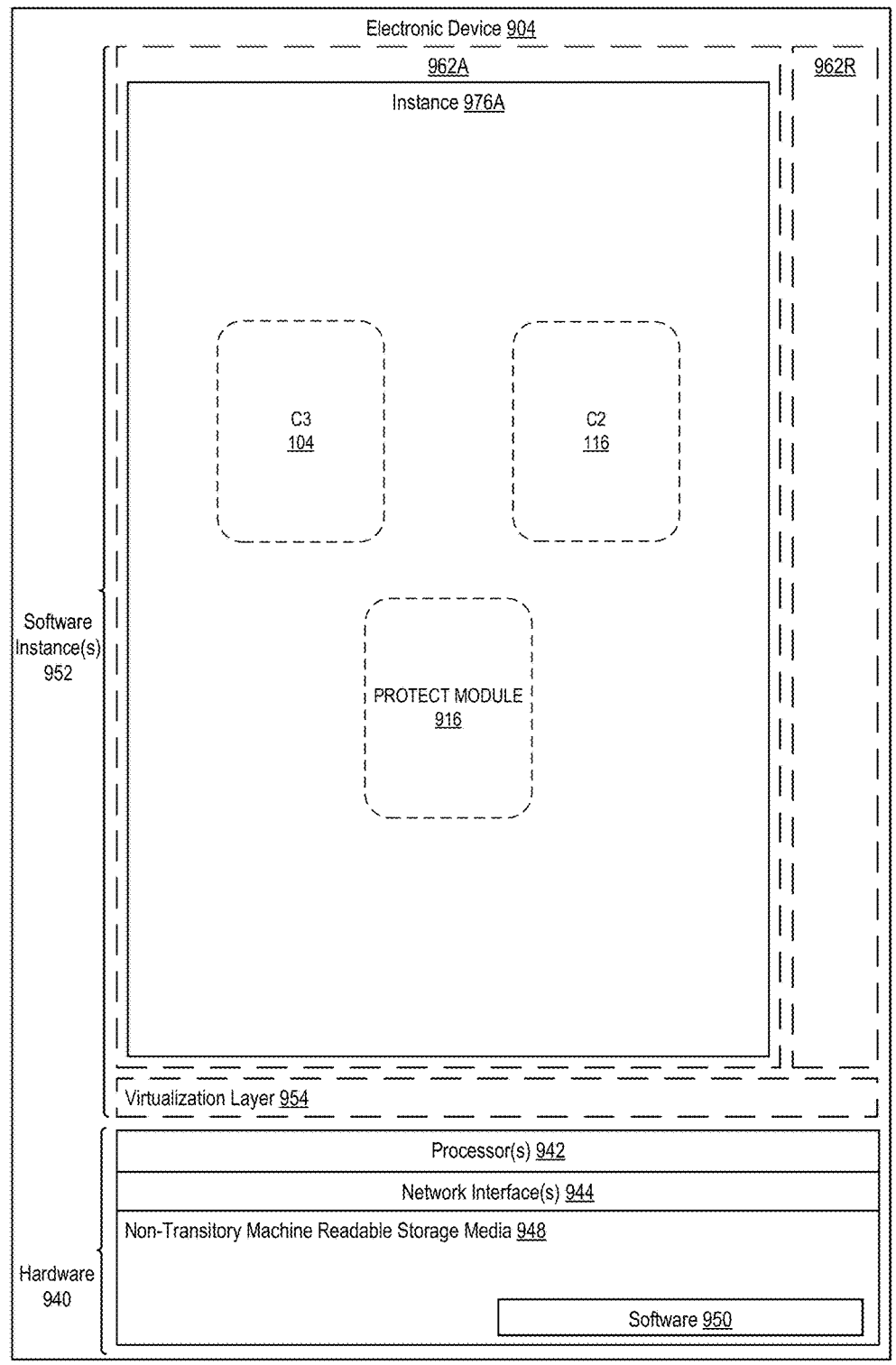
FIG. 9 is a block diagram illustrating an exemplary data processing system that can be used in some embodiments.

FIG. 9 illustrates an electronic device 904 according to some embodiments. FIG. 9 includes hardware 940 comprising a set of one or more processor(s) 942 and a set or one or more network interfaces 944 (wireless and/or wired), as well as non-transitory machine-readable storage media 948 having stored therein software 950. Each of the C3, C2, and/or the Protects may be implemented in one or more electronic devices 904. In one embodiment, C3 104 is implemented in a separate one of the electronic devices 904 (e.g., referred to as a server end station, in which case the software 950 is the software to implement the C3 104), the C2 is implemented in a separate set of one or more of the electronic devices 904 (e.g., referred to as a server end station; in which case, the software 950 in each such server end station is the software to implement the C2 116), and each of the Protects can be implemented in separate electronic devices 904 (in which case, the software 950 in each electronic device is the software to implement the protect module 916). In operation, these electronic devices would be commutatively coupled (e.g., by one or more networks).

In electronic devices that use compute virtualization, the processor(s) 942 typically execute software to instantiate a virtualization layer 954 and software container(s) 962A-962R (e.g., with operating system-level virtualization, the virtualization layer 954 represents the kernel of an operating system (or a shim executing on a base operating system) that allows for the creation of multiple software containers 962A-962R (representing separate user space instances and also called virtualization engines, virtual private servers, or jails) that may each be used to execute a set of one or more applications; with full virtualization, the virtualization layer 954 represents a hypervisor (sometimes referred to as a virtual machine monitor (VMM)) or a hypervisor executing on top of a host operating system, and the software containers 962A-962R each represent a tightly isolated form of software container called a virtual machine that is run by the hypervisor and may include a guest operating system; with para-virtualization, an operating system or application running with a virtual machine may be aware of the presence of virtualization for optimization purposes). Again, in end stations where compute virtualization is used, during operation an instance of the software 950 (illustrated as instance 976A) is executed within the software container 962A on the virtualization layer 954. In end stations where compute virtualization is not used, the instance 976A on top of a host operating system is executed on the "bare metal" electronic device 904. The instantiation of the instance 976A, as well as the virtualization layer 954 and software containers 962A-R if implemented, are collectively referred to as software instance(s) 952.

Alternative embodiments of an electronic device may have numerous variations from that described above. For example, customized hardware and/or accelerators might also be used in the server end stations.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" and the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Throughout the description, embodiments of the present invention have been presented through flow diagrams. It will be appreciated that the order of transactions and transactions described in these flow diagrams are only intended for illustrative purposes and not intended as a limitation of the present invention. For example, although the flow diagrams illustrated in the figures show a particular order of operations performed by certain embodiments, it should be understood that such order is exemplary (e.g., alternative embodiments may perform the operations in a different order, combine certain operations, overlap certain operations, etc.). Accordingly, one having ordinary skill in the art would recognize that variations can be made to the flow diagrams without departing from the broader spirit and scope of the invention as set forth in the following claims. Various modifications and equivalents are within the scope of the following claims.

What is claimed is:

1. A method in a server implemented by one or more server end stations for detecting atypical or malicious wireless communications activity via one or more of a plurality of Protects, wherein the plurality of Protects are electronic devices operable to observe wireless communications activity over a plurality of wireless protocols, the method comprising:

receiving, at the server, observation data sent by the plurality of Protects, wherein the observation data received from each of the plurality of Protects comprises data from wireless messages sniffed by that Protect or statistical data generated by that Protect based upon the wireless messages sniffed by that Protect, wherein at least one of the plurality of Protects is a mobile device that does not have a fixed location, wherein the plurality of Protects are sniffers in that they are neither a source of the wireless messages nor an intended recipient of the wireless messages;

generating, by the server, a plurality of sets of filters based at least in part upon the received observation data, wherein each of the plurality of sets of filters is:
specific to one or more but not all of the plurality of Protects,
generated based upon at least some of the received observation data transmitted by the one or more Protects, and
can be used to distinguish between those of future sniffed wireless messages that are to be discarded by the one or more Protects and those of the future sniffed wireless messages that are to be reported to the server;

transmitting, by the server, each of the plurality of sets of filters to the corresponding one or more of the plurality of Protects to cause the plurality of Protects to process the future sniffed wireless messages utilizing the plurality of sets of filters;

receiving, at the server, an alert message transmitted by a first Protect of the plurality of Protects based upon an application, by the first Protect, of at least one of the plurality of sets of filters with regard to one or more additional wireless messages sniffed by the first Protect, wherein the alert message indicates that the one or more additional wireless messages involve atypical or malicious wireless communications activity;

responsive to the received alert message, executing, by the server, one or more false positive elimination procedures to determine whether the received alert message is a false positive, including:
obtaining, by the server, additional observation data from one or more other Protects of the plurality of Protects that provide a coverage overlap with the first Protect; and
determining, by the server, whether the additional observation data supports a conclusion that the one or more additional wireless messages involve atypical or malicious wireless communications activity; and causing, by the server, an alert to be generated responsive to the one or more false positive elimination procedures determining that the alert message is not a false positive.

2. The method of claim 1, wherein the one or more false positive elimination procedures includes:
determining, by the server based at least in part upon the received observation data, whether the one or more additional wireless messages, which were sent by a device, are atypical with regard to previous activity of the device or with regard to previous activity of other devices of a same type as the device.

3. The method of claim 1, wherein all communications between the plurality of Protects and the server occurs through one or more aggregation modules implemented by one or more devices located at one or more sites, wherein the plurality of Protects are located at least occasionally at the one or more sites.

4. The method of claim 1, wherein at least one of plurality of Protects monitors at least two of the following wireless communications types:
Bluetooth;
Bluetooth Low Energy;
Wi-Fi;
Zigbee; and
Cellular.

5. The method of claim 4, wherein the plurality of Protects collectively monitor at least three of the wireless communications types.

6. The method of claim 1, wherein at least one of the plurality of Protects is battery-powered.

7. The method of claim 1, wherein the one or more additional wireless messages involve atypical or malicious wireless communications activity due to the one or more additional wireless messages:
involving a communication with a blacklisted network address or resource identifier;
matching a defined pattern of activity known to be a signature of an attack; or
involving an unknown device not previously observed by the plurality of Protects.

8. The method of claim 1, wherein the one or more additional wireless messages involve atypical or malicious wireless communications activity due to the one or more additional wireless messages involving:
a previously-observed device communicating at a new location; or
an amount of data being transmitted by a device that is greater than a threshold amount of data.

9. The method of claim 1, wherein at least one of the plurality of Protects is deployed at a different geographic location or building than another one of the plurality of Protects.

10. A non-transitory computer-readable storage medium having instructions which, when executed by one or more processors of one or more server end stations, cause the one or more server end stations to implement a server to perform operations to detect atypical or malicious wireless communications activity via one or more of a plurality of Protects, wherein the plurality of Protects are electronic devices operable to observe wireless communications activity over a plurality of wireless protocols, wherein the operations include:

receiving observation data sent by the plurality of Protects, wherein the observation data received from each of the plurality of Protects comprises data from wireless messages sniffed by that Protect or statistical data generated by that Protect based upon the wireless messages sniffed by that Protect, wherein at least one of the plurality of Protects is a mobile device that does not have a fixed location, wherein the plurality of Protects are sniffers in that they are neither a source of the wireless messages nor an intended recipient of the wireless messages;

generating a plurality of sets of filters based at least in part upon the received observation data, wherein each of the plurality of sets of filters is:
specific to one or more but not all of the plurality of Protects, generated based upon at least some of the received observation data transmitted by the one or more Protects, and can be used to distinguish between those of future sniffed wireless messages that are to be discarded by the one or more Protects and those of the future sniffed wireless messages that are to be reported to the server;

transmitting each of the plurality of sets of filters to the corresponding one or more of the plurality of Protects to cause the plurality of Protects to process the future sniffed wireless messages utilizing the plurality of sets of filters;

receiving an alert message transmitted by a first Protect of the plurality of Protects based upon an application, by the first Protect, of at least one of the plurality of sets of filters with regard to one or more additional wireless messages sniffed by the first Protect, wherein the alert message indicates that the one or more additional wireless messages involve atypical or malicious wireless communications activity;

responsive to the received alert message, executing one or more false positive elimination procedures to determine whether the received alert message is a false positive, including:

obtaining additional observation data from one or more other Protects of the plurality of Protects that provide a coverage overlap with the first Protect; and determining whether the additional observation data supports a conclusion that the one or more additional wireless messages involve atypical or malicious wireless communications activity; and causing an alert to be generated responsive to the one or more false positive elimination procedures determining that the alert message is not a false positive.

11. The non-transitory computer-readable storage medium of claim 10, wherein the one or more false positive elimination procedures includes:

determining, based at least in part upon the received observation data, whether the one or more additional wireless messages, which were sent by a device, are atypical with regard to previous activity of the device or with regard to previous activity of other devices of a same type as the device.

12. The non-transitory computer-readable storage medium of claim 10, wherein all communications between the plurality of Protects and the server occurs through one or more aggregation modules implemented by one or more devices located at one or more sites, wherein the plurality of Protects are located at least occasionally at the one or more sites.

13. The non-transitory computer-readable storage medium of claim 10, wherein at least one of plurality of Protects monitors at least two of the following wireless communications types:

Bluetooth;
Bluetooth Low Energy;
Wi-Fi;
Zigbee; and
Cellular.

14. The non-transitory computer-readable storage medium of claim 13, wherein the plurality of Protects collectively monitor at least three of the wireless communications types.

15. A method in a server implemented by one or more server end stations for efficiently detecting atypical or malicious wireless communications activity via one or more Protects despite limited activity reporting from the one or more Protects to the server, wherein the limited activity reporting enables a communication load between the one or more Protects and the server to be reduced compared to full activity reporting without degrading the ability of the server to detect the atypical or malicious wireless communications activity, wherein each of the one or more Protects is an electronic device operable to observe wireless communications activity over a plurality of wireless protocols, the method comprising:

generating, by the server, one or more sets of filters based at least in part upon observation data received from the one or more Protects, wherein the one or more sets of filters can be used by the one or more Protects to distinguish between sniffed wireless messages that are to be discarded by the one or more Protects due to being representative of normal network activity and other sniffed wireless messages that are to be reported to the server due to not being representative of normal network activity or being representative of known malicious activity, wherein the observation data resulted from the one or more Protects applying a previous one or more sets of filters and includes data from previous wireless messages sniffed by the one or more Protects or statistical data generated by the one or more Protects based upon the previous wireless messages;

transmitting, by the server, the one or more sets of filters to the one or more Protects to cause the one or more Protects to process additional sniffed wireless messages utilizing the one or more sets of filters;

receiving, at the server, additional observation data sent by the one or more Protects based upon the one or more Protects applying the one or more sets of filters, wherein the additional observation data comprises data from the additional sniffed wireless messages or statistical data generated based upon at least some of the additional sniffed wireless messages, wherein the one or more sets of filters caused fewer of the additional sniffed wireless messages to be reported than would have been reported if the previous one or more sets of filters had been applied to the additional sniffed wireless messages; and responsive to an alert message received by a first Protect of the one or more Protects, executing one or more false positive elimination procedures to determine whether the alert message is a false positive, including:

obtaining additional observation data from at least a second Protect of the one or more Protects that provides a coverage overlap with the first Protect; and determining whether the additional observation data supports a conclusion that one or more wireless messages that caused the first Protect to issue the alert message involve atypical or malicious wireless communications activity.

16. The method of claim 15, wherein:
the one or more Protects includes a plurality of Protects;
a first set of one or more of the plurality of Protects are mobile devices that do not have a fixed location; and
a second set of one or more of the plurality of Protects utilize wired energy sources and have a fixed location during use.

17. The method of claim 16, wherein each of the second set of Protects are configured to report back to the server comparatively more wireless communications activity than those of the first set of Protects.

18. The method of claim 15, wherein all communications between the one or more Protects and the server occurs through one or more aggregation modules implemented by one or devices located at one or more sites, wherein the one or more Protects are located at least occasionally at the one or more sites.

19. The method of claim 15, wherein the one or more sets of filters include at least one rule-based attack detection filter and at least one anomaly detection filter.

20. The method of claim 15, wherein the generating of the one or more sets of filters includes:
computing, by the server, one or more models based upon the observation data via one or more machine learning algorithms, wherein each of the one or more models is a compact mathematical representation representing normal wireless communications activity represented by the observation data; and
compiling, by the server, the one or more models into the one or more sets of filters.

21. The method of claim 15, wherein the one or more sets of filters allow each of the one or more Protects to determine a degree of abnormality of the additional sniffed wireless messages.

22. A non-transitory computer-readable storage medium having instructions which, when executed by one or more processors of one or more server end stations, cause the one or more server end stations to implement a server to perform operations to efficiently detect atypical or malicious wireless communications activity via one or more Protects despite limited activity reporting from the one or more Protects to the server, wherein the limited activity reporting enables a communication load between the one or more Protects and the server to be reduced compared to full activity reporting without degrading the ability of the server to detect the atypical or malicious wireless communications activity, wherein each of the one or more Protects is an electronic device operable to observe wireless communications activity over a plurality of wireless protocols, wherein the operations include:
generating one or more sets of filters based at least in part upon observation data received from the one or more Protects, wherein the one or more sets of filters can be used by the one or more Protects to distinguish between sniffed wireless messages that are to be discarded by the one or more Protects due to being representative of normal network activity and other sniffed wireless messages that are to be reported to the server due to not being representative of normal network activity or being representative of known malicious activity, wherein the observation data resulted from the one or more Protects applying a previous one or more sets of filters and includes data from previous wireless messages sniffed by the one or more Protects or statistical data generated by the one or more Protects based upon the previous wireless messages;
transmitting the one or more sets of filters to the one or more Protects to cause the one or more Protects to process additional sniffed wireless messages utilizing the one or more sets of filters;
receiving additional observation data sent by the one or more Protects based upon the one or more Protects applying the one or more sets of filters, wherein the additional observation data comprises data from the additional sniffed wireless messages or statistical data generated based upon at least some of the additional sniffed wireless messages, wherein the one or more sets of filters caused fewer of the additional sniffed wireless messages to be reported than would have been reported if the previous one or more sets of filters had been applied to the additional sniffed wireless messages; and
responsive to an alert message received by a first Protect of the one or more Protects, executing one or more false positive elimination procedures to determine whether the alert message is a false positive, including:
obtaining additional observation data from at least a second Protect of the one or more Protects that provides a coverage overlap with the first Protect; and
determining whether the additional observation data supports a conclusion that one or more wireless messages that caused the first Protect to issue the alert message involve atypical or malicious wireless communications activity.

23. The non-transitory computer-readable storage medium of claim 22, wherein:
the one or more Protects includes a plurality of Protects;
a first set of one or more of the plurality of Protects are mobile devices that do not have a fixed location; and
a second set of one or more of the plurality of Protects utilize wired energy sources and have a fixed location during use.

24. The non-transitory computer-readable storage medium of claim 23, wherein each of the second set of Protects are configured to report back to the server comparatively more wireless communications activity than those of the first set of Protects.

25. The non-transitory computer-readable storage medium of claim 22, wherein all communications between the one or more Protects and the server occurs through one or more aggregation modules implemented by one or devices located at one or more sites, wherein the one or more Protects are located at least occasionally at the one or more sites.

26. The non-transitory computer-readable storage medium of claim 22, wherein the one or more sets of filters include at least one rule-based attack detection filter and at least one anomaly detection filter.

27. The non-transitory computer-readable storage medium of claim 22, wherein the generating of the one or more sets of filters includes:
computing one or more models based upon the observation data via one or more machine learning algorithms, wherein each of the one or more models is a compact mathematical representation representing normal wireless communications activity represented by the observation data; and
compiling the one or more models into the one or more sets of filters.

28. The non-transitory computer-readable storage medium of claim 22, wherein the one or more sets of filters allow each of the one or more Protects to determine a degree of abnormality of the additional sniffed wireless messages.

* * * * *